US008725981B2

(12) United States Patent
Eguchi et al.

(10) Patent No.: US 8,725,981 B2
(45) Date of Patent: *May 13, 2014

(54) STORAGE SYSTEM AND METHOD IMPLEMENTING ONLINE VOLUME AND SNAPSHOT WITH PERFORMANCE/FAILURE INDEPENDENCE AND HIGH CAPACITY EFFICIENCY

(71) Applicant: Hitachi, Ltd., Tokyo (JP)

(72) Inventors: Yoshiaki Eguchi, Yokohama (JP); Shunji Kawamura, Yokohama (JP)

(73) Assignee: Hitachi, Ltd, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/664,542

(22) Filed: Oct. 31, 2012

(65) Prior Publication Data

US 2013/0054534 A1 Feb. 28, 2013

Related U.S. Application Data

(63) Continuation of application No. 12/352,749, filed on Jan. 13, 2009, now Pat. No. 8,316,203.

(30) Foreign Application Priority Data

Nov. 21, 2008 (JP) .................................. 2008-298423

(51) Int. Cl.
*G06F 12/00* (2006.01)

(52) U.S. Cl.
USPC .................. 711/170; 711/162; 711/E12.012; 711/E12.002; 711/E12.103

(58) Field of Classification Search
USPC .................. 711/162, 170, E12.001, E12.002, 711/E12.103
See application file for complete search history.

(56) References Cited

U.S. PATENT DOCUMENTS

| | | | |
|---|---|---|---|
| 2006/0218364 | A1 | 9/2006 | Kitamura |
| 2007/0112893 | A1 | 5/2007 | Okada et al. |
| 2007/0174673 | A1 | 7/2007 | Kawaguchi et al. |
| 2007/0271429 | A1 | 11/2007 | Eguchi et al. |
| 2008/0065829 | A1 | 3/2008 | Inoue et al. |
| 2008/0228990 | A1 | 9/2008 | Tomonaga |
| 2009/0198929 | A1 | 8/2009 | Saika |
| 2010/0131727 | A1 | 5/2010 | Eguchi et al. |

FOREIGN PATENT DOCUMENTS

| | | |
|---|---|---|
| JP | 2002373093 | 12/2002 |
| JP | 2003280825 | 10/2003 |
| JP | 2007140700 | 6/2007 |
| JP | 2007199922 | 8/2007 |
| JP | 2007272317 | 10/2007 |
| JP | 2007310631 | 11/2007 |
| JP | 2008140002 | 6/2008 |
| JP | 2008217689 | 9/2008 |

*Primary Examiner* — Reginald Bragdon
*Assistant Examiner* — Mehdi Namazi
(74) *Attorney, Agent, or Firm* — Brundidge & Stanger, P.C.

(57) ABSTRACT

A storage system for storage of data written from a computer, and when a write request of data to a first logical volume is received, the data on request is stored into the first logical volume. When a first-generation snapshot creation request is received, the data stored in the first logical volume at the time of receiving the first-generation snapshot creation request is written into a pool region as data corresponding to a first-generation snapshot, and when a second-generation snapshot creation request is received, any portion of the data updated after the first-generation snapshot creation request is received but before the second-generation snapshot creation request is issued is read from the first logical volume for writing into the pool region. Such a storage system favorably implements snapshot backup with no dependency with a positive volume in terms of performance and failure, and with high capacity efficiency.

14 Claims, 23 Drawing Sheets

SYSTEM CONFIGURATION

CONFIGURATION OF MANAGEMENT SERVER

CONFIGURATION OF MAINTENANCE MANAGEMENT TERMINAL

FIG. 10 LOGICAL CONFIGURATION (PAIR CONFIGURATION)

DIRECT ACCESS MANAGEMENT TABLE

PS ON INITIAL SETTING

ACCESS TO SVOL BEING THE LATEST

ACCESS TO SVOL NOT BEING THE LATEST

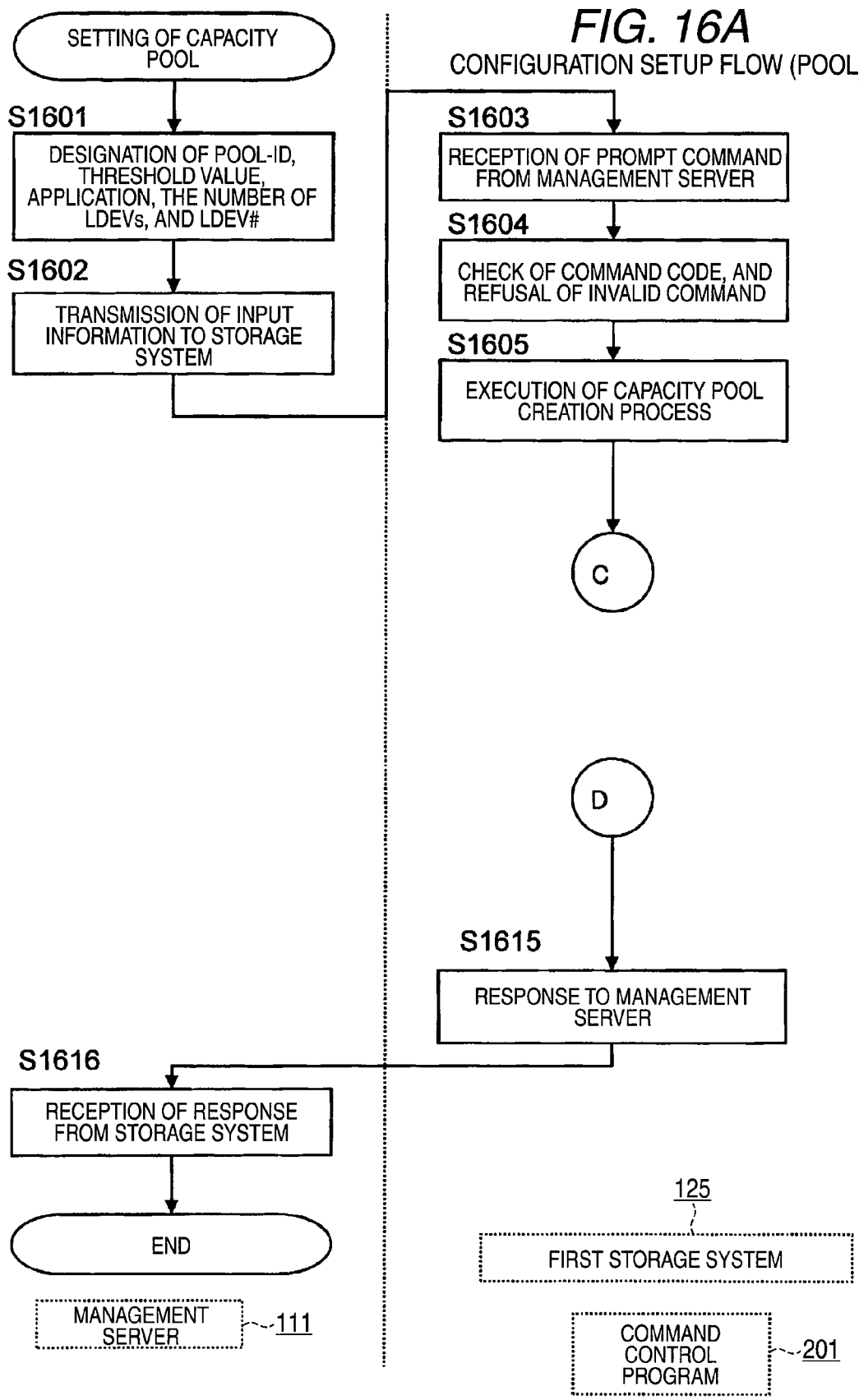

CONFIGURATION SETUP FLOW (POOL)

CONFIGURATION SETUP FLOW (VIRTUAL VOLUME)

CONFIGURATION SETUP FLOW (VIRTUAL VOLUME)

PRECEDING COPY

PRECEDING COPY DURING DATA RESTORING

FIG. 22    PVOL READ

PRECEDING COPY

STORAGE SYSTEM AND METHOD IMPLEMENTING ONLINE VOLUME AND SNAPSHOT WITH PERFORMANCE/FAILURE INDEPENDENCE AND HIGH CAPACITY EFFICIENCY

CROSS REFERENCES TO RELATED APPLICATIONS

The present application is a continuation of application Ser. No. 12/352,749, filed Jan. 13, 2009; which relates to and claims priority from Japanese Patent Application No. 2008-298423, filed on Nov. 21, 2008, the entire disclosure of which is incorporated herein by reference.

BACKGROUND OF THE INVENTION

1. Field of the Invention

The present invention relates to a data backup method for a storage system and, more specifically, to a data backup method with application of a so-called differential snapshot technology.

2. Description of the Related Art

For protection of data in a storage system, various types of technologies are known for continuously backing up the data.

As an example, Patent Document 1 (JP-A-2002-373093) describes the technology of copying a memory area (logical volume) in its entirety at the time of designation, and keeping the resulting copy as backup data. With such a technology, two logical volumes (logical disks in Patent Document 1) configure a mirror. Out of the two logical disks, when a positive logical volume (master logical disk in Patent Document 1) is written with data by a host computer, the data is also written into a sub logical volume (snapshot logical disk in Patent Document 1). When the mirror is disassembled, the snapshot logical disk carries therein the copy of the entire master logical disk at the time of disassembly of the mirror.

Patent Document 2 (JP-A-2003-280825) describes the technology of keeping differential data as backup data. Specifically, when any data stored in a positive logical volume (master storage in Patent Document 2) is updated, only the updated portion of the data, i.e., differential data, is copied into a sub logical volume (pile storage in Patent Document 2), and the resulting copy is kept therein. By combining the updated data in the master storage with the differential data in the pile storage, the data in the master storage before update can be restored.

SUMMARY OF THE INVENTION

With the technology of Patent Document 1 above, for restoring the data in the master logical disk at the time of disassembly of the mirror, referring to the snapshot logical disk will do, and there thus is no need to refer to the latest master logical disk. Accordingly, the access capabilities to the latest master logical disk are not affected by the process of restoring the data in the master logical disk at the time of disassembly of the mirror. That is, the master logical disk and the snapshot logical disk can be independent from each other in terms of performance. Moreover, even when the master logical disk is suffering from failure, using the snapshot logical disk can restore the data in the master logical disk at the time of disassembly of the mirror. That is, the master logical disk and the snapshot logical disk can be independent from each other in terms of failure.

The problem with the technology of Patent Document 1 is that, however, the snapshot logical disk storing the copy of the entire master logical disk means using a large amount of storage capacity of the storage system. Especially if with a larger number of backup generations for storage, a considerable amount of storage capacity is used, thereby problematically reducing the capacity efficiency.

On the other hand, with the technology of Patent Document 2, only the differential data is stored. Compared with the technology of Patent Document 1, the storage capacity to be used is thus reduced so that the capacity efficiency is increased. The problem with the technology of Patent Document 2 is that, however, for restoring the data in the master storage before update, there always needs to combine the data in the latest master storage with the data in the pile storage. This means that the process of restoring the data in the master storage before update affects the access capabilities to the latest master storage. What is more, when the master storage suffers from failure, the data in the master storage before update cannot be restored.

A typical aspect of the invention is directed to a storage system for storage of data written from a computer. The storage system includes: a memory medium that provides a physical memory area for data; and a control device that controls over data input/output to/from the memory medium. In the storage system, a part of the physical memory area is provided by the control device to the computer as a first logical volume, and another part of the physical memory area is allocated to a pool region under the management of the control device. The control device stores, when receiving a write request of data to the first logical volume, the data on request into the first logical volume, reads, when receiving a first-generation snapshot creation request, the data stored in the first logical volume at the time of receiving the first-generation snapshot creation request, and writes the data being a read result into the pool region as data corresponding to a first-generation snapshot, and reads, when receiving a second-generation snapshot creation request after receiving the first-generation snapshot creation request, from the data stored in the first logical volume at the time of receiving the second-generation snapshot creation request, any portion of the data updated after the first-generation snapshot creation request is received but before the second-generation snapshot creation request is issued, and writes the data being a read result into the pool region as data corresponding to a second-generation snapshot.

According to the aspect of the invention, data backup can be implemented with high capacity efficiency while keeping positive and sub logical volumes independent from each other in terms of failure and performance.

BRIEF DESCRIPTION OF THE DRAWINGS

FIG. 16A is a first portion of the flowchart of a process to be executed for setting of a capacity pool in the embodiment of the invention;

DESCRIPTION OF THE PREFERRED EMBODIMENT

An embodiment of the invention is described first in detail by referring to the accompanying drawings.

Figure 1:
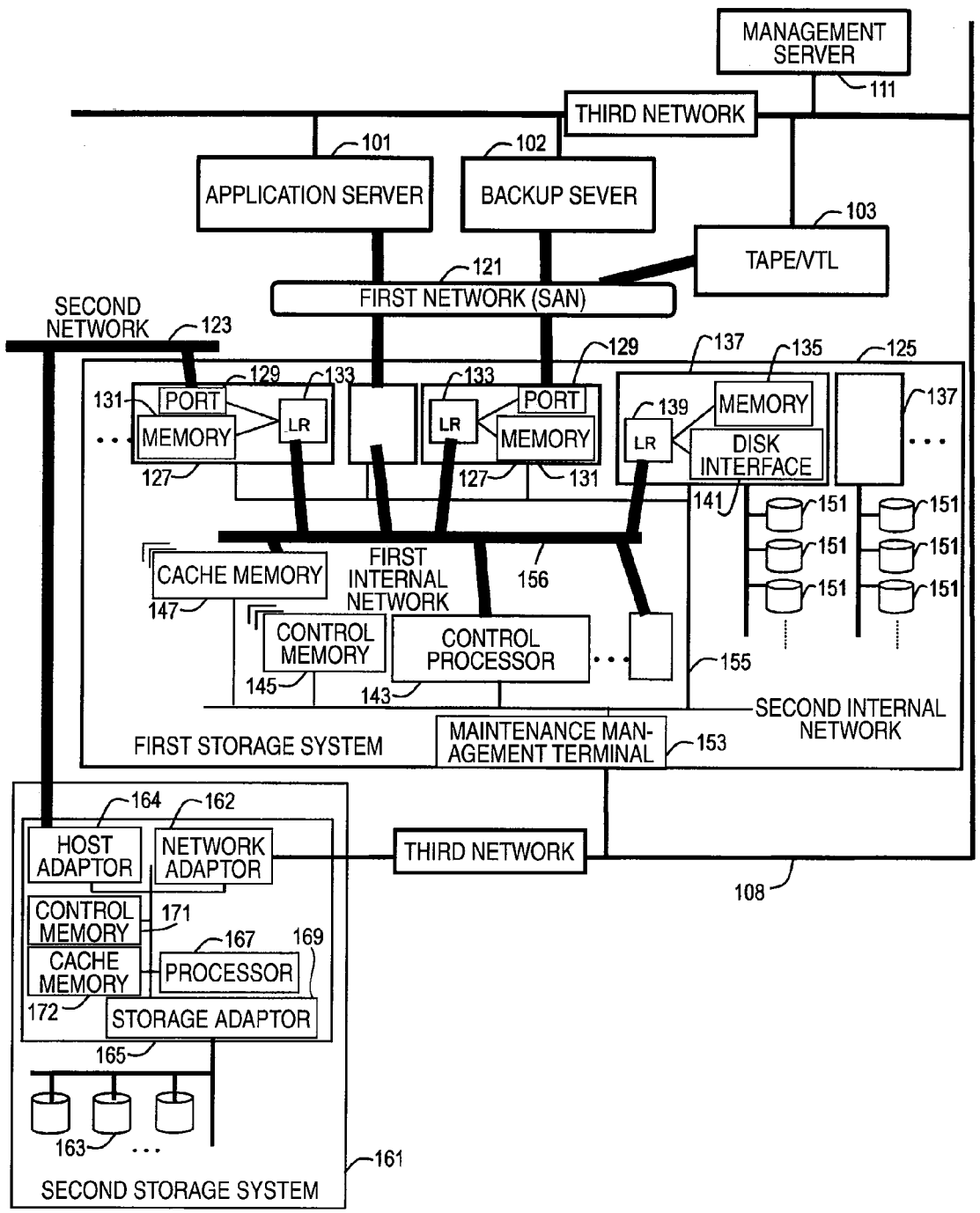
FIG. 1 is a block diagram showing the configuration of a computer system in an embodiment of the invention.

FIG. 1 is a block diagram showing the configuration of a computer system in the embodiment of the invention.

The computer system of the embodiment is configured to include an application server 101, a backup server 102, a tape device 103, a management server 111, a first storage system 125, and a second storage system 161. The first storage system 125 is coupled to the other components, i.e., the application server 101, the backup server 102, and the tape device 103, over a first network 121. The second storage system 161 is coupled to such a first storage system 125 over a second network 123. The components, i.e., the application server 101, the backup server 102, the tape device 103, the management server 111, and the first and second storage systems 125 and 161, are coupled together over a third network 108.

The first to third networks 121, 123, and 108 are not restricted by type. In this embodiment, exemplified is a case where the first and second networks 121 and 123 are each a so-called SAN (Storage Area Network) using an FC (Fibre Channel) protocol. On the other hand, the third network 108 may be exemplified by a so-called LAN (Local Area Network) using an IP (Internet Protocol).

The application server 101 is a computer making access to logical volumes to be provided by the first storage system 125. The detailed configuration of the application server 101 will be described later (refer to FIG. 3).

The backup server 102 is a computer in charge of control over backup of data stored in the first storage system 125. The detailed configuration of the backup server 102 will be described later (refer to FIG. 4).

The management server 111 is a computer in charge of management of the components coupled to the third network 108, i.e., the application server 101, the backup server 102, the tape device 103, and the first and second storage systems 125 and 161. The detailed configuration of the management server 111 will be described later (refer to FIG. 5).

The first storage system 125 is provided therein with a controller and a storage device group. The controller is configured to include a plurality of front-end interfaces 127, a plurality of back-end interfaces 137, a first internal network 156, one or more cache memories 147, one or more control memories 145, and one or more control processors 143, for example.

The storage device group is configured by a plurality of physical storage devices (hereinafter, referred to as "PDEVs") 151.

The front-end interfaces 127 are each an interface circuit for communications with the component coupled to the first storage system 125 over the network, i.e., the application server 101, the back-up server 102, or the second storage system 161. As such, in FIG. 1 example, the first storage system 125 is provided with at least three front-end interfaces 127, and at least two of those interfaces 127 are coupled to the first network 121, and at least the remaining one interface 127 is coupled to the second network 123.

The front-end interfaces 127 are each provided with a port 129, a memory 131, and a local router (hereinafter, abbreviated to as "LR") 133, for example. The port 129 is coupled to the first or second network 121 or 123. The LR 133 is coupled with the port 129 and the memory 131.

The LR 133 serves to allocate data provided via the port 129 for processing by any arbitrary control processor 143. To be specific, the control processor 142 makes the setting of the LR 133 in such a manner as to execute an Input/Output (I/O) command for address designation, for example. In accordance with the setting made as such, the LR 133 allocates the I/O command and the data.

The back-end interfaces 137 are each an interface circuit for communications with the PDEVs 151. The backend interfaces 137 are each provided with a disk interface 141, a memory 135, and an LR 139, which are coupled to the PDEVs 151, for example. The LR 139 is coupled with the disk interface 141 and the memory 135.

The first internal network 156 is configured by a switch, e.g., crossbar switch, or a bus. The first internal network 156 is coupled with a plurality of front-end interfaces 127, a plurality of back-end interfaces 137, one or more cache memories 147, one or more control memories 145, and one or more control processors 143. These components communicate to one another over the first internal network 156.

The cache memory 147 serves to temporarily store therein data to be read or write in accordance with an I/O command coming from the application server 101.

The control memory 145 serves to store therein various types of computer programs and information. The details of the computer programs and information to be stored in the control memory 145 will be described later (refer to FIG. 2).

The control processor 143 serves to implement control by the controller. To be specific, the control processor 143 executes processes that will be described later by running the various types of computer programs stored in the control memory(ies) 145.

The PDEV 151 is a nonvolatile memory device, and is exemplified by a hard disk drive (HDD), or a so-called SSD (Solid State Drive) using a flash storage device. Alternatively, two or more PDEVs 151 may configure a RAID (Redundant Array of Independent Disks) group, i.e., a PDEV group under the RAID rule.

The components of the controller, i.e., the front-end interfaces 127, the back-end interfaces 137, the cache memory(ies) 147, the control memory(ies) 145, and the control processor(s) 143, are coupled with the second internal network 155, e.g., LAN. The second internal network 155 is also coupled with a maintenance management terminal 153. The maintenance management terminal 153 is coupled also to the third network 108.

The maintenance management terminal 153 is a computer in charge of maintenance or management of the first storage system 125. An operator of the first storage system 125 can define various types of information stored in the control memory(ies) 145 through operation of the maintenance management terminal 153 (or the management server 111 that can communicate with the maintenance management terminal 153), for example. The detailed configuration of the maintenance management terminal 153 will be described later (refer to FIG. 6).

The second storage system 161 is configured to include a controller 165 and a PDEV(s) 163. The controller 165 is configured to include a network adaptor 162, a host adaptor 164, a cache memory 172, a control memory 171, a processor 167, and a storage adaptor 169, for example.

The network adaptor 162 is an interface coupled to the third network 108 for communications with the management server 111.

The host adaptor 164 is an interface coupled to the second network 123 for communications with the first storage system 125. The host adaptor 164 may be similar to the front-end interface 127 of the first storage system 125, for example.

The control memory 171 serves to store therein various types of computer programs and information.

The cache memory 172 serves to temporarily store therein data to be read or written in accordance with an I/O command coming from the first storage system 125.

The processor 167 runs the various types of computer programs stored in the control memory 171. The processor 167 at least controls over data reading and writing from/to the cache memory 172 and the PDEV(s) 163 in accordance with an I/O command coming from the first storage system 125.

The PDEV 163 is a physical storage device, and may be similar to the PDEVs 151 of the first storage system, for example.

The first storage system 125 in this embodiment has a so-called external coupling function. By this function, the second storage system 161 is externally coupled to the first storage system 125. Described now is this external coupling.

As already described above, the first storage system 125 provides one or more logical volumes to the application server 101. The logical volumes are each acknowledged as a storage device by the application server 101. The logical volume(s) provided by the first storage system 125 as such may be correlated to the PDEVs 151 in the first storage system 125, for example. If this is the case, when receiving a write command to any one logical volume, the first storage system 125 stores data in the PDEV 151 correlated to the logical volume.

Alternatively, the logical volume(s) provided by the first storage system 125 may be respectively correlated to the PDEVs 163 in the second storage system 161. If this is the case, when receiving a write command to any one logical volume, the first storage system 125 generates a write command for data writing into any of the PDEVs 163 correlated to the logical volume, and forwards the resulting write command to the second storage system 161. The second storage system 161 performs data storage into the PDEV 163 in accordance with the write command provided by the first storage system 125.

As such, the function of storing the data not into the logical volume provided by the first storage system 125 but actually into the second storage system 161 coupled to the outside of the first storage system 125 is referred to as external coupling function.

The tape device 103 is provided with one or more tape drives (not shown), and one or more tape memory media (not shown). The tape device 103 is used mainly for storage of backup copy (replica) of the data stored in the first or second storage system 125 or 161.

For example, the backup server 102 reads the data stored in the first or second storage system 125 or 161, and makes a request to the tape device 103 for writing of the data read as such. Upon reception of such a write request, the tape device 103 stores the data on request into the tape memory medium (media). When receiving a request coming from the backup server 102 for reading the data stored in the tape memory medium, the tape device 103 reads the data on request from the tape memory medium for transmission to the backup server 102.

Alternatively, in the tape device 103, the tape drive(s) and the tape memory medium (media) may be replaced by a virtual tape library (VTL) provided with a disk storage unit or any other type of storage unit.

Figure 2:
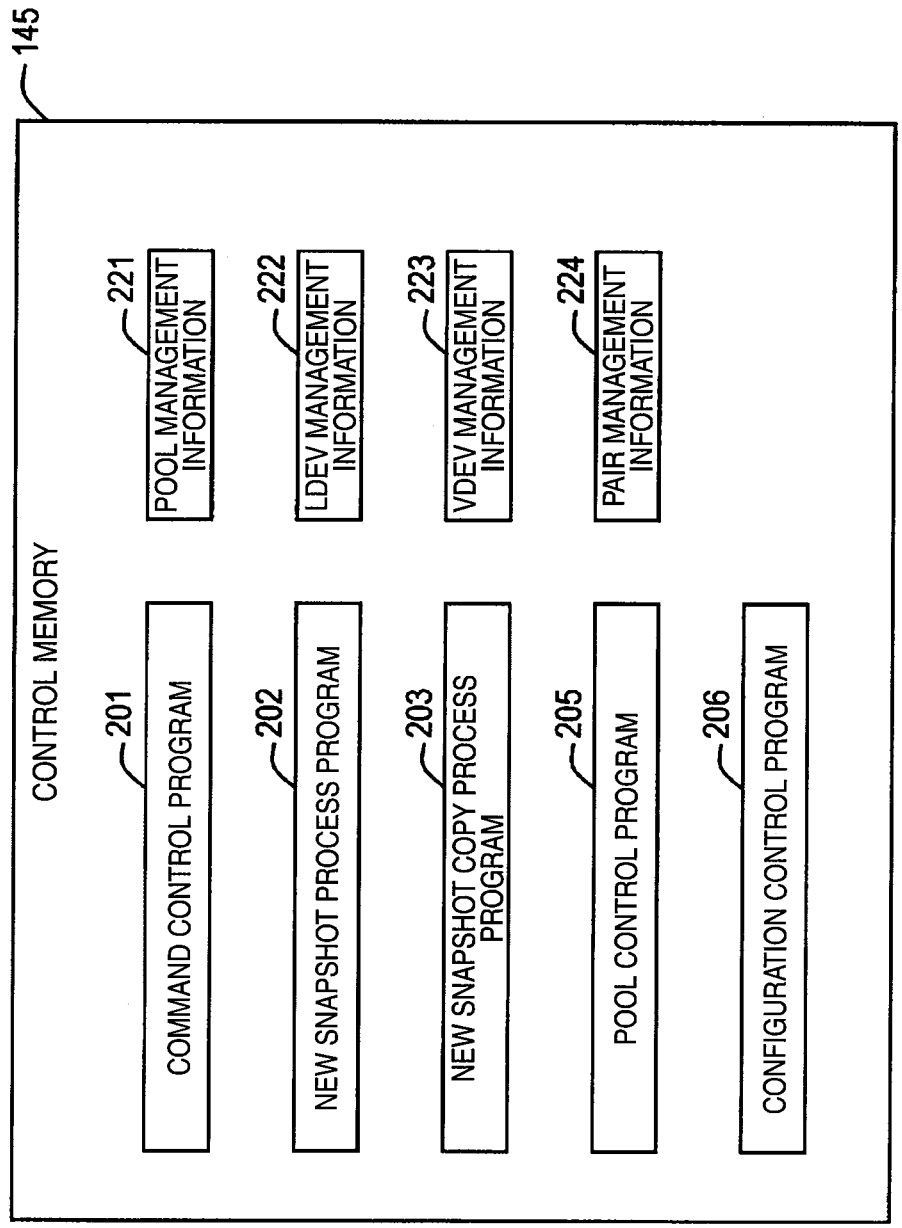
FIG. 2 is a diagram illustrating computer programs and information stored in a control memory of a first storage system in the embodiment of the invention.

FIG. 2 is a diagram illustrating the computer programs and information stored in the control memory(ies) 145 of the first storage system 125 in the embodiment of the invention.

In the description below, the processes to be executed by the programs are actually executed by the control processor(s) 143 in charge of running the programs.

The control memory 145 stores therein various types of computer programs and information, i.e., a command control program 201, a new snapshot process program 202, a new snapshot copy process program 203, a pool control program 205, a configuration control program 206, pool management information 221, LDEV management information 222, VDEV management information 223, and pair management information 224.

The command control program 201 executes a command provided by any higher-level computer. For example, the command control program 201 performs control over I/O in accordance with I/O commands coming from the application server 101, i.e., a data write command or a data read command. The command control program 201 also executes commands coming from the management server 111. The new snapshot process program 202 performs control over a process for creating snapshots. The new snapshot copy process program 203 performs control over data copying to be performed for creating snapshots. The pool control program 205 makes the setting of capacity pool that will be described later. The configuration control program 206 makes the setting of management information kept in the first storage system 125.

The pool management information 221 includes information for use to manage the capacity pool. The LDEV management information 222 includes information for use to manage LDEVs 802. The VDEV management information 223 includes information for use to manage VDEVs 801. The LDEVs 802 and the VDEVs 801 will be described later (refer to FIG. 8). The pair management information 224 includes information for use to manage a pair of a PVOL (Primary Volume) 701 and an SVOL (SnapShot Volume) 702 that will be described later.

In the description below, the processes to be executed by the first storage system 125 are actually executed by the control processor(s) 143 running the above-described programs stored in the control memory(ies) 145.

Figure 3:
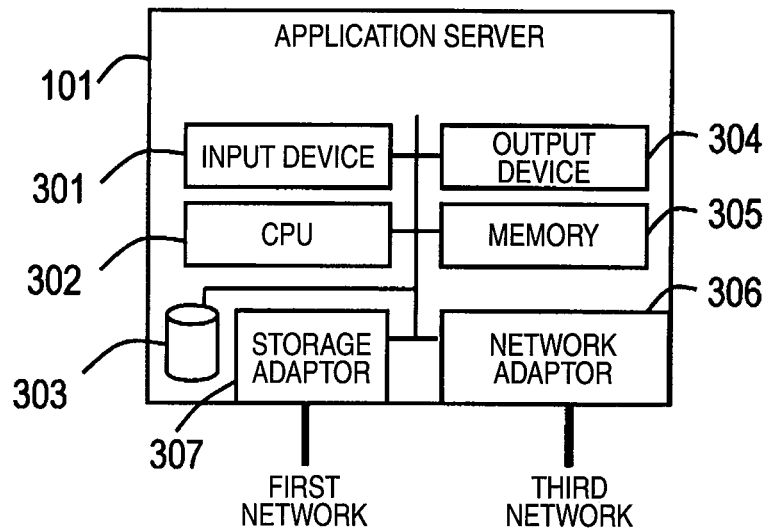
FIG. 3 is a block diagram showing the configuration of an application server in the embodiment of the invention.

FIG. 3 is a block diagram showing the configuration of the application server 101 in the embodiment of the invention.

The application server 101 is a computer configured to include a CPU (Central Processing Unit) 302, a memory 305, an auxiliary storage device 303, an input device, e.g., keyboard and pointing device, 301, an output device, e.g., display device, 304, a storage adaptor 307 coupled to a SAN 121, e.g., host bus adaptor, and a network adaptor 306 coupled to the third network 108.

The memory 305 stores therein programs to be run by the CPU 302. The memory 305 in this embodiment stores therein an operating system (OS) (not shown), and application programs (not shown) operating thereon.

The CPU 302 running the application programs forwards, if required, an I/O command, i.e., write command or read command, with an address designation via the storage adaptor 307.

Figure 4:
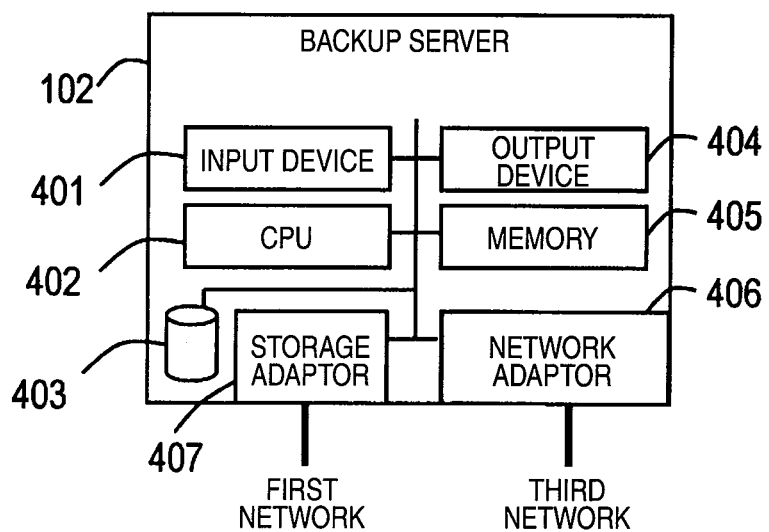
FIG. 4 is a block diagram showing the configuration of a backup server in the embodiment of the invention.

FIG. 4 is a block diagram showing the configuration of the backup server 102 in the embodiment of the invention.

The backup server 102 is a computer configured to include a CPU 402, a memory 405, an auxiliary storage device 403, an input device, e.g., keyboard and pointing device, 401, an output device, e.g., display device, 404, a storage adaptor coupled to the SAN 121, e.g., host bus adaptor, 407, and a network adaptor 406 coupled to the third network 108.

The memory 405 stores therein programs to be run by the CPU 402. The memory 405 in this embodiment stores therein an operating system (OS) (not shown), and backup control programs (not shown) operating thereon.

The backup server 102 performs control over a process for backing up the data stored in the first storage system 125 into the tape device 103. For example, the CPU 402 running a backup control program performs data reading from the first storage system 125 based on a user's request or any preset schedule, and writes the data read as such into the tape device 103. Such a process will be described later.

Figure 5:
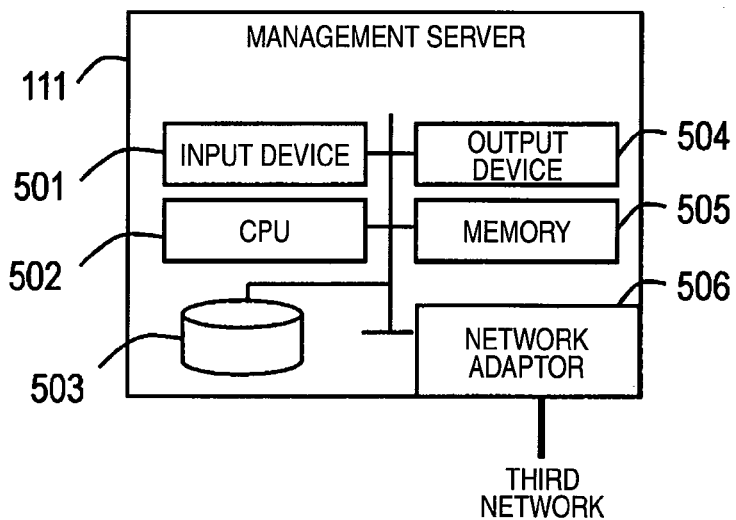
FIG. 5 is a block diagram showing the configuration of a management server in the embodiment of the invention.

FIG. 5 is a block diagram showing the configuration of the management server 111 in the embodiment of the invention.

The management server 111 is a computer configured to include a CPU 502, a memory 505, an auxiliary storage device 503, an input device, e.g., keyboard and pointing device, 501, an output device, e.g., display device, 504, and a network adaptor 506 coupled to the third network 108.

The CPU 502 forwards a command to the application server 101, or the first or second storage system 125 or 161 coupled to the third network 108 via the network adaptor 506. The memory 505 serves to store therein a management program (not shown) and management information (not shown) for use to manage the first and second storage systems 125 and 161. By the CPU 502 running the management program stored in the memory 505, a process is executed for managing the first storage system 125 or others.

Figure 6:
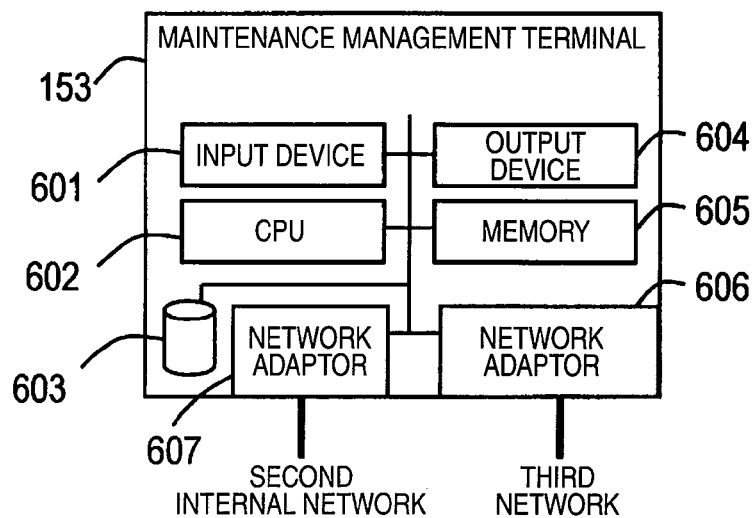
FIG. 6 is a block diagram showing the configuration of a maintenance management terminal in the embodiment of the invention.

FIG. 6 is a block diagram showing the configuration of the maintenance management terminal 153 in the embodiment of the invention.

The maintenance management terminal 153 is a computer configured to include a CPU 602, a memory 605, an auxiliary storage device 603, an input device, e.g., keyboard and pointing device, 601, an output device, e.g., display device, 604, a network adaptor 606 coupled to the third network 108, and a network adaptor 607 coupled to the second internal network 155.

By the CPU 602 running a maintenance management program (not shown) stored in the memory 605, a process is executed for maintenance and management of the first storage system 125, e.g., setting change of the first storage system 125. This process may be executed in accordance with a request made by an operator directly operating the maintenance management terminal 153, or in accordance with a request coming from the management server 111.

Figure 7:
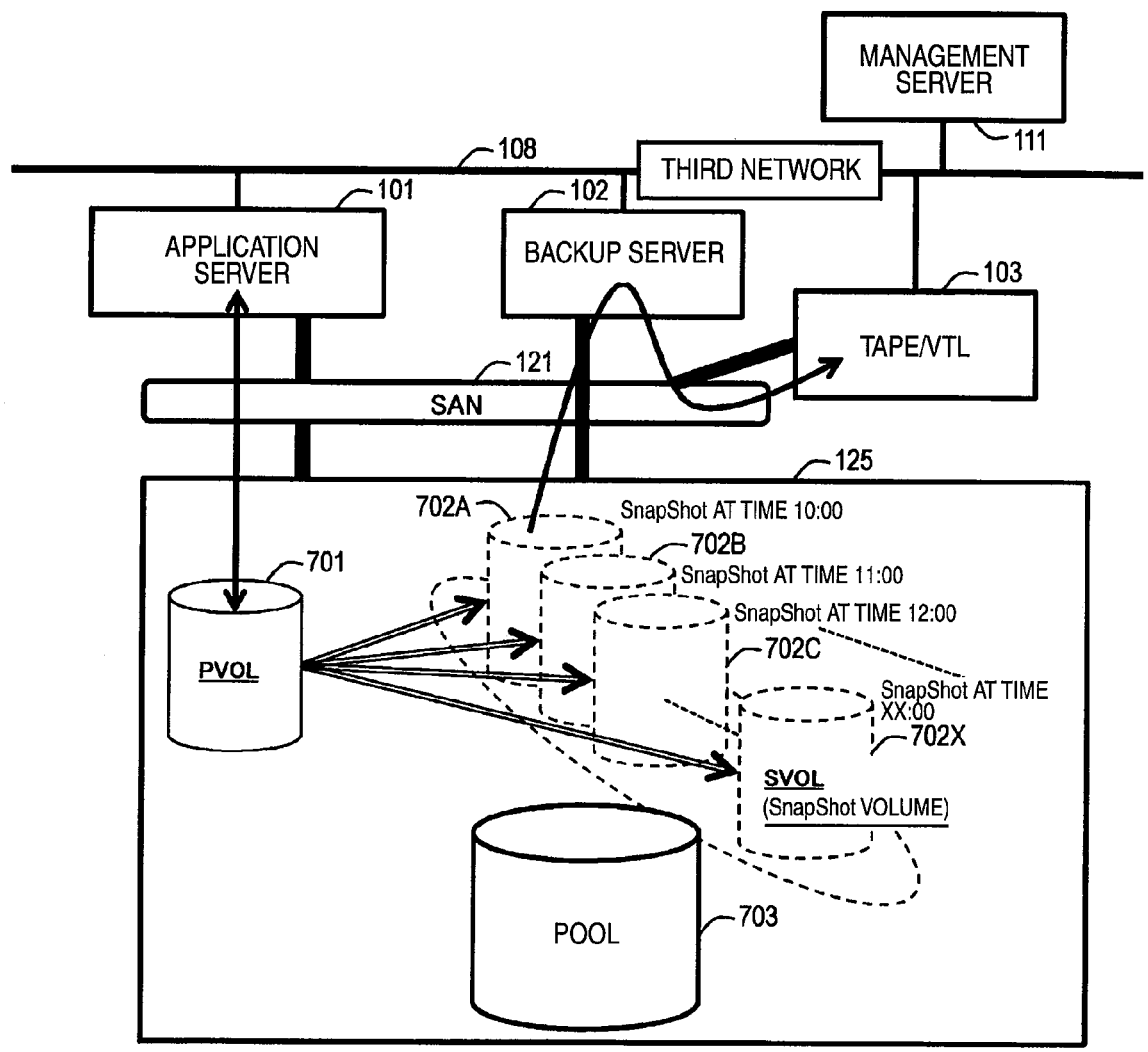
FIG. 7 is a diagram illustrating a logical volume and snapshots provided by the first storage system in the embodiment of the invention.

FIG. 7 is a diagram illustrating a logical volume and snapshots to be provided by the first storage system 125 in the embodiment of the invention.

The PVOL (Primary Volume) 701 is a memory area, which is provided by the first storage system 125 to the application server 101. The application server 101 forwards a data write request and a data read request with the PVOL 701 being a target. The PVOL 701 may be a logical volume correlated to the PDEV 151, or may be a logical volume correlated to the PDEV 163.

The PVOL 701 is correlated to a plurality of SVOLs (SnapShot Volumes) 702, which are each a virtual logical volume provided by the first storage system 125 to the backup server 102. The SVOLs 702 are each a snapshot of the PVOL 701 at a specific time, i.e., a replica of the PVOL 701 at the time. The SVOLs 702A to 702C, and the SVOL 702X of FIG. 7 are examples of the SVOLs 702. In the description below, when the SVOLs 702A to 702C and the SVOL 702X are not necessarily discriminated, these are sometimes referred to collectively also as SVOLs 702.

In FIG. 7 example, the SVOL 702A is a snapshot of the PVOL 701 created at time 10:00. That is, the data read from the SVOL 702A is the same as the data stored in the PVOL 701 at time 10:00. Similarly, the SVOL 702B is a snapshot of the PVOL 701 created at time 11:00. The SVOL 702C is a snapshot of the PVOL 701 created at time 12:00. The SVOL 702X is a snapshot of the PVOL 701 created at time XX:00.

The backup server 102 designates a time for snapshot creation (or the snapshot generation number having the one-to-one relationship with the creation time), and forwards a data read request with respect to the SVOL 702. When the time 11:00 is designated, data reading is performed from the SVOL 702B, and the data read as such is forwarded to the backup server 102. The backup server 102 is allowed to forward, to the tape device 103, a request for storing the data of the SVOL 702B acquired as such into a tape memory medium.

Note here that, as will be described later, a plurality of SVOLs 702 are not necessarily entirely managed as logical volumes like the PVOL 701. As will be described later, when receiving a read request from the backup server 102 with a designation of any of the SVOLs 702, the first storage system 125 makes a response by reading any portion of data stored in a snapshot capacity pool 703, i.e., any portion of data corresponding to the designated time (refer to FIGS. 8 to 10).

The snapshot capacity pool 703 includes one or more logical volumes. The snapshot capacity pool 703 stores therein data found in the SVOLs 702 at the respective times. To be specific, the snapshot capacity pool 703 stores, as will be described later, an entire copy of the PVOL 701 at a specific time, and a differential copy with respect to the entire copy.

Figure 8:
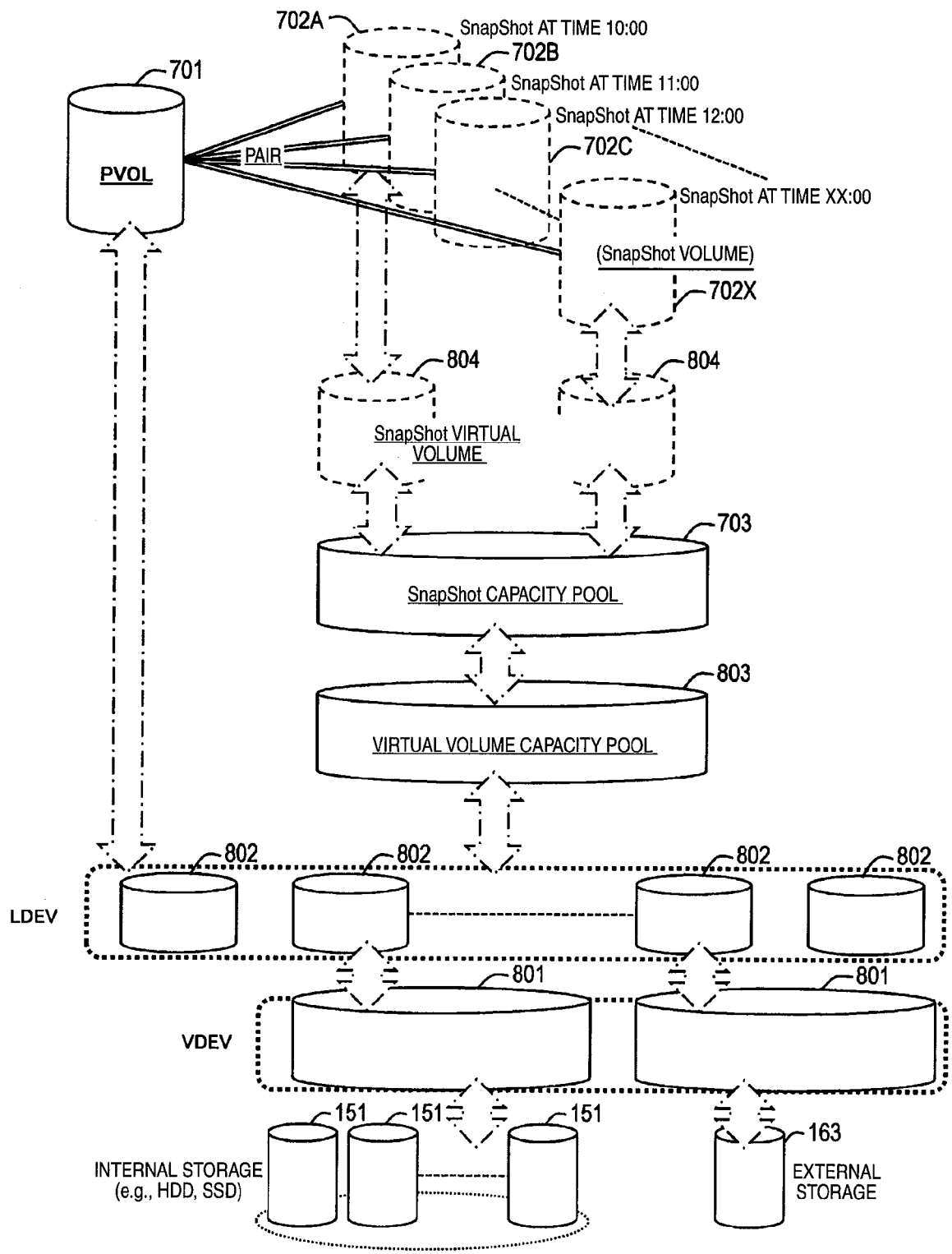
FIG. 8 is a first diagram illustrating the logical configuration of a storage system in the embodiment of the invention.

FIG. 8 is a first diagram illustrating the logical configuration of the storage system in the embodiment of the invention.

To be specific, FIG. 8 is a diagram illustrating the hierarchy configuration of a logical volume to be provided by the first storage system 125 in the embodiment.

The first storage system 125 serves to manage the memory area of the PDEV 151 and that of the PDEV 163 as one or more virtual devices (VDEVs) 801.

For example, one or more VDEVs 801 are respectively correlated to one or more PDEVs 151. When a plurality of PDEVs 151 configure a RAID group, one RAID group may be correlated to one VDEV 801. If this is the case, the memory capacity of the VDEV 801 is equal to the capacity as a result of subtracting the capacity for parity from the memory capacity of the RAID group.

Alternatively, the VDEV 801 may be correlated with one or more PDEVs 163 of the second storage system 161 coupled externally to the first storage system 125.

The memory area of one or more VDEVs 801 is correlated, respectively, to one or more logical devices (LDEVs) 802. For example, the memory area of one VDEV 801 may be partially correlated to a plurality of LDEVs 802, or the memory area of a plurality of VDEVs 801 may be correlated to one LDEV 802. An operator of the first storage system 125 is allowed to arbitrarily set a correlation of the memory area of the VDEV 801 to the LDEV 802.

The PVOL 701 is correlated to one or more LDEVs 802. Upon reception of a request for data writing into any portion of the memory area of the PVOL 701, for example, the first storage system 125 makes various identifications, i.e., identifies the memory area of the LDEV 802 corresponding to the portion of the memory area of the PVOL 701, identifies the memory area of the VDEV 801 corresponding to the memory area of thus identified LDEV 802, and identifies the memory area of the PDEV 151 or that of the PDEV 163 corresponding to the memory area of thus identified VDEV 801. The first storage system 125 then performs writing of data on request into the identified memory area of the PDEV 151 or that of the PDEV 163.

At least one of the LDEVs 802 not correlated to the PVOL 701 is used as a virtual volume capacity pool 803. The LDEV(s) 802 to be used as the virtual volume capacity pool 803 is referred to also as pool volume.

The memory area in the virtual volume capacity pool 803 is allocated, if required, to the memory area provided by the snapshot capacity pool 703. The memory area of the snapshot capacity pool 703 is allocated, if required, to the memory area provided by a snapshot virtual volume 804. There is a one-to-one relationship between the snapshot virtual volume 804 and the SVOL 702.

For example, when receiving a request for writing of data with a designation of any address of the SVOL 702 as a write destination, the first storage system 125 makes a determination whether the memory area of the snapshot virtual volume 804 corresponding to the address is allocated with the memory area of the snapshot capacity pool 703 or not. When determining NO, i.e., the memory area of the snapshot capacity pool 703 is not allocated, the first storage system 125 allocates any portion of the memory area of the snapshot capacity pool 703 not yet allocated to the memory area of the snapshot virtual volume 804 to the memory area designated as a write destination.

When the memory area of the snapshot capacity pool 703 allocated as such is not yet allocated with the memory area of the virtual volume capacity pool 803, the first storage system 125 allocates, to the memory area of the snapshot capacity pool 703, any portion of the memory area of the virtual volume capacity pool 803 not yet allocated to the memory area of the snapshot capacity pool 703.

Note here that such allocation of memory area is performed on the basis of an allocation unit of a predetermined size, e.g., virtual memory area of a predetermined size called page.

Figure 9:
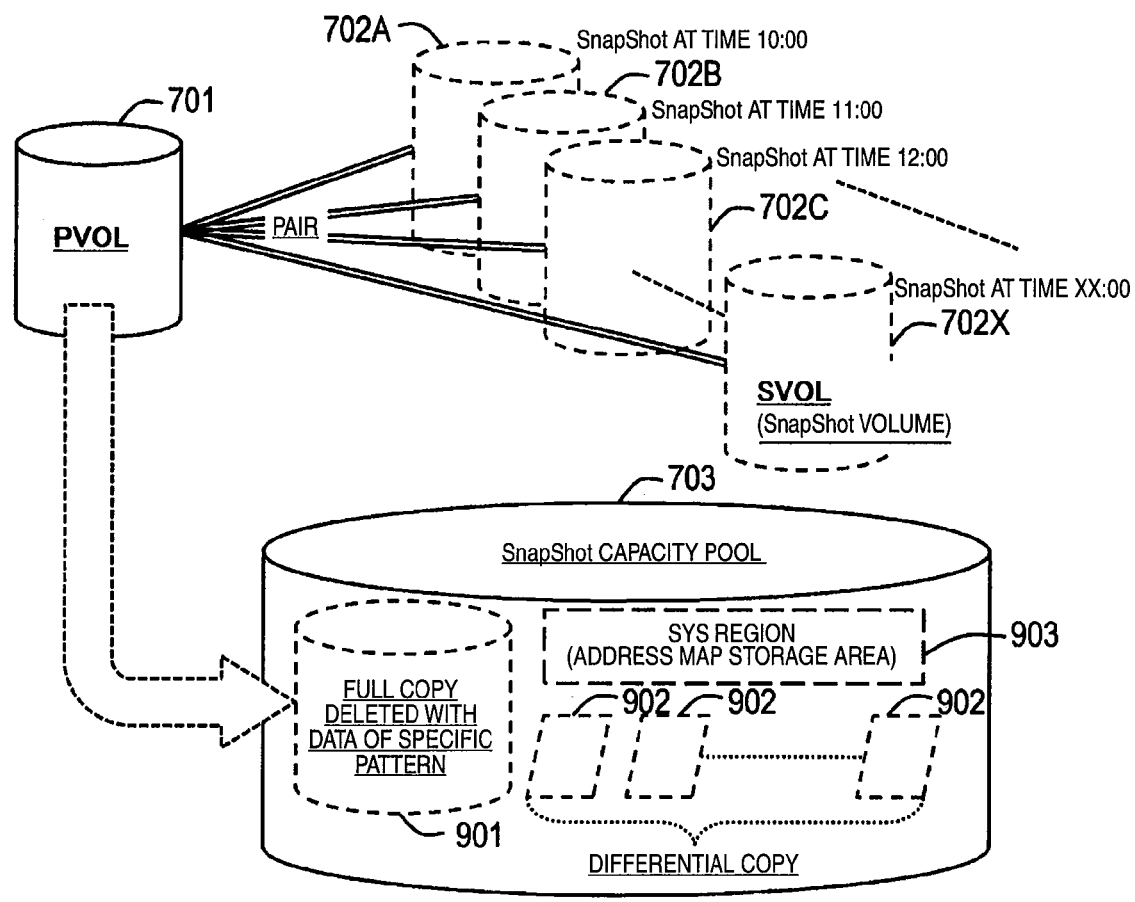
FIG. 9 is a second diagram illustrating the logical configuration of the storage system in the embodiment of the invention.

FIG. 9 is a second diagram illustrating the logical configuration of the storage system in the embodiment of the invention.

To be specific, FIG. 9 is a diagram illustrating a pair of a PVOL and an SVOL to be provided by the first storage system 125 of the embodiment.

The PVOL 701 and the SVOL 702 corresponding thereto configure a pair. As described by referring to FIG. 7, when one PVOL 701 is correlated with a plurality of SVOLs, the PVOL 701 forms a pair with each of the SVOLs 702. For example, the PVOL 701 forms a pair with the SVOL 702A, and the PVOL 701 forms a pair also with the SVOL 702B.

The snapshot capacity pool 703 stores therein data needed for provision of the SVOLs 702. To be specific, the snapshot capacity pool 703 includes a full copy 901, a differential copy 902, and an SYS region 903.

The full copy 901 includes the entire data of a snapshot created for the first time. As shown in FIG. 9, when the snapshot creation is performed firstly for the PVOL 701 at time 10:00, i.e., the SVOL 702A, a copy of the entire data of the PVOL 701 at time 10:00 is stored as the full copy 901. In this case, the SVOL 702A corresponds to the full copy 901.

Instead of storing a copy of the entire data of the PVOL 701 as the full copy 901 as such, any portion of the entire data of the PVOL 701 not of a predetermined specific pattern may be only stored as the full copy 901. Herein, the data of a specific pattern may be data to be written at the time of initiation of a logical volume, e.g., data only of "0".

As described by referring to FIG. 8, unless writing of data is performed, the memory area of the snapshot capacity pool 703 is not allocated with the memory area of the virtual volume capacity pool 803. That is, the memory area of the snapshot capacity pool 703 not written with data does not consume any physical memory area of the PDEV 151 or others. By not storing the data of a specific pattern as the full copy 901 as such, any physical memory area is not consumed for storing the data of a specific pattern.

To be specific, for snapshot creation for the first time, the first storage system 125 determines whether data for storage into the allocation units includes data other than the data of a specific pattern or not. Only when the data includes such data other than the data of a specific pattern, the first storage system 125 writes the data into the snapshot capacity pool 703. Alternatively, the first storage system 125 may temporarily store the entire data of the PVOL 701 into the snapshot capacity pool 703 as the full copy 901. The first storage system 125 then refers to the allocation units for the full copy 901 one by one, and when any of the allocation units stores only the data of a specific pattern, the memory area of the virtual volume capacity pool 803 having been allocated to the allocation unit is deallocated.

As such, when only data not of a specific pattern is stored as the full copy 901, the snapshot capacity pool 703 stores, in its predetermined memory area, the data of a specific pattern.

When a read request is provided to any of the allocation units for the full copy 901 not yet allocated with the memory area of the virtual volume capacity pool 803, the first storage system 125 makes a response by reading the data of a specific pattern stored in the predetermined memory area.

When a snapshot of a second generation or thereafter is created after a first-generation snapshot is created, any difference from the full copy 901 is stored as a differential copy 902 into the snapshot capacity pool 703.

The SYS region 903 stores therein data stored in the snapshot capacity pool 703, i.e., data in the full copy 901 and data in the differential copy 902, and an address map for use to manage the address correlation between the PVOL 701 and the SVOL 702, i.e., a direct access management table 1102 that will be described later.

Exemplified now is a case where a first-generation snapshot is created for the PVOL 701 at time 10:00 as shown in FIG. 9, and second- and third-generation snapshots are created at time 11:00 and time 12:00, respectively. In this case, any portion of the data of the SVOL 701 updated between the time 10:00 and the time 11:00 is stored as the differential copy 902 corresponding to the second-generation snapshot, i.e., SVOL 702B. Any portion of the data of the PVOL 701 updated from the time 11:00 to the time 12:00 is stored as the differential copy 902 corresponding to the third-generation snapshot, i.e., SVOL 702C.

Thereafter, when a request for reading the data of the SVOL 702B, i.e., the second-generation snapshot, is provided, the first storage system 125 makes a response by reading the data of any snapshot corresponding to the address designated as a data read target. To be specific, when the differential copy 902 in storage is the data of the second-generation snapshot corresponding to the designated address, the first storage system 125 reads the data for making a response. On the other hand, when the data of the designated address is not changed between the time 10:00 and the time 11:00, it means that the data of the second-generation snapshot corresponding to the designated address is not stored as the differential data 902. In this case, the first storage system 125 makes a response by reading the data of the immediately-preceding generation corresponding to the designated address, i.e., first generation in the above example, from the full copy 901.

As described above, for reading data of a snapshot of any generation, there needs to read at least any of the differential copy(ies) 902 corresponding to the generation, the differential copy(ies) 902 corresponding to the generation(s) preceding thereto, and the full copy 901 of the earliest generation, but there is no need to read the data of the PVOL 701.

Figure 10:
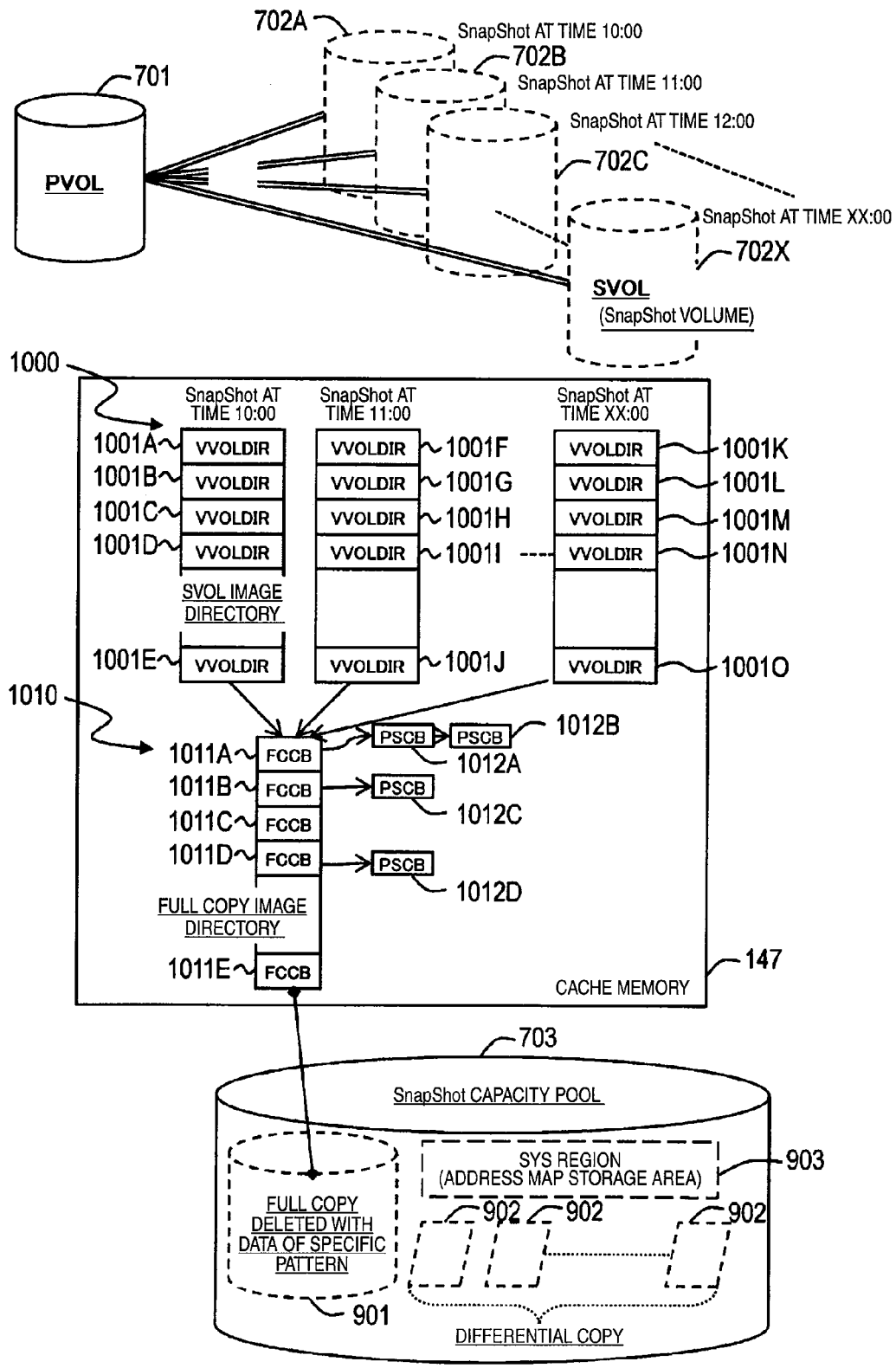
FIG. 10 is a diagram illustrating data to be stored in an SYS region in a snapshot capacity pool in the embodiment of the invention.

FIG. 10 is a diagram illustrating the data to be stored in the SYS region 903 in the snapshot capacity pool 703 of the embodiment of the invention.

When the first storage system 125 is activated, the data stored in the SYS region 903 is expanded in a high-speed-accessible memory, e.g., cache memory 147, thereby implementing the high-speed access to the SVOL 702. FIG. 10 shows the SYS region 903 expanded on the cache memory 147.

The SYS region 903 at least stores therein an SVOL image directory 1000, and a full copy image directory 1010.

The SVOL image directory 1000 includes a plurality of VVOLDIRs (virtual volume directory) 1001 respectively corresponding to the snapshots of various generations. FIG. 10 shows, as an example, VVOLDIRs 10001A to 1001E corresponding to the snapshot at time 10:00, VVOLDIRs 1001F to 1001J corresponding to the snapshot at time 11:00, and VVOLDIRs 1001K to 10010 corresponding to the snapshot at time XX:00. In the below, when any arbitrary one or more of the VVOLDIRs 1001A to 10010 are denoted, such VVOLDIR(s) are also referred to as VVOLDIR(s) 1001.

The VVOLDIRs 1001 respectively correspond to the addresses, e.g., so-called logical block addresses, in the SVOL 702 designated as an input/output destination of data. When the VVOLDIRs 1001 are respectively corresponding to the logical block addresses as such, the VVOLDIRs 1001 each include the logical block address corresponding thereto, the address of an FCCB (Full Copy Control Block) 1011 (will be described later) corresponding thereto, and information about the generation of a snapshot corresponding thereto.

Note here that the information about the generation of a snapshot is the one to be used to identify the generation of the snapshot, e.g., a generation number of the snapshot, a time when the snapshot of the generation is created, an identifier of the SVOL 702 corresponding to the snapshot of the generation, and an identifier of a pair of the SVOL 702 and the PVOL 701.

The full copy image directory 1010 includes a plurality of FCCBs (Full Copy Control Blocks) 1011. FIG. 10 shows FCCBs 1011A to 1011E as examples. In the below, when any arbitrary one or more of the FCCBs 1011A to 1011E are denoted, such FCCB(s) are also referred to as FCCB(s) 1001.

The FCCBs 1011 respectively correspond to the addresses, e.g., so-called logical block addresses, in the SVOL 702 designated as an input/output destination of data. That is, the FCCBs 1011 respectively correspond to the VVOLDIRs 1001 of the various generations. For example, when the VVOLDIR 1001A, the VVOLDIR 1001F, and the VVOLDIR 1001K all correspond to the same logical block address of each varying SVOL, the VVOLDIR 1001A, the VVOLDIR 1001F, and the VVOLDIR 1001K are all correlated to the same FCCB 1011, e.g., FCCB 1011A.

The FCCBs 1011 each include a pointer for use to correlate itself to any other management information, e.g., SSCB or PSCB that will be described later. The FCCBs 1011 in this embodiment are respectively correlated to PSCBs (Pool Slot Control Blocks) 1012 via the SSCB (refer to FIGS. 10 and 12).

FIG. 10 shows the PSCBs 1012A to 1012D as examples. In the below, when any arbitrary one or more of the PSCBs 1012A to 1012D are denoted, such PSCB(s) are also referred to as PSCB(s) 1012. The PSCBs 1012 each include a pointer for use to correlate itself to any other PSCB 1012. In FIG. 10 example, the PSCB 1012A is correlated to the PSCB 1012B. The PSCBs 1012 are also each provided with a logical block address in the differential copy 902 of the snapshot capacity pool 703.

Figure 11:
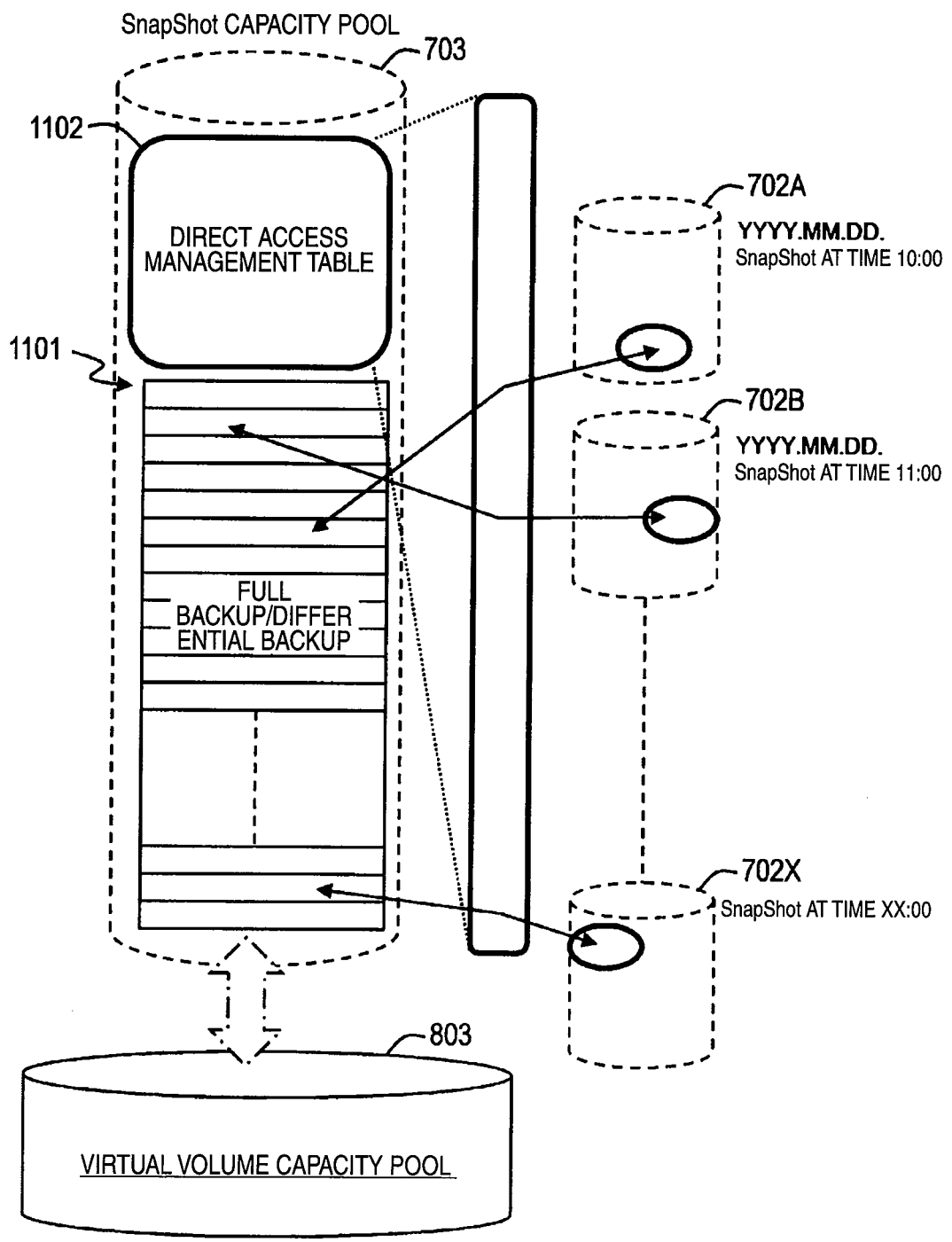
FIG. 11 is a diagram illustrating mapping at the time of an access to SVOLs in the embodiment of the invention.

FIG. 11 is a diagram illustrating mapping at the time of an access to the SVOLs 702 in the embodiment of the invention.

The SYS region 903 of the snapshot capacity pool 703 stores therein the direct access management table 1102. This direct access management table 1102 includes the SVOL image directory 1000, the full copy image directory 1010, and others shown in FIG. 10. Their detailed configurations will be described later (refer to FIG. 12).

A full backup/differential backup 1101 corresponds to the full copy 901 and the differential copy 902. That is, the full backup/differential backup 1101 is partially corresponding to the full copy 901, and the remaining is corresponding to the differential copy 902.

When receiving a data input/output request, i.e., a data write request or a data read request, to the SVOL 702, the first storage system 125 refers to the direct access management table 1102, thereby identifying any area in the full backup/differential backup 1101 corresponding to the address designated as a data input/output destination. The first storage system 125 then performs data writing or data reading to/from the identified area. Actually performed is data writing or reading to/from the memory area of the virtual volume capacity pool allocated to the identified area.

Figure 12:
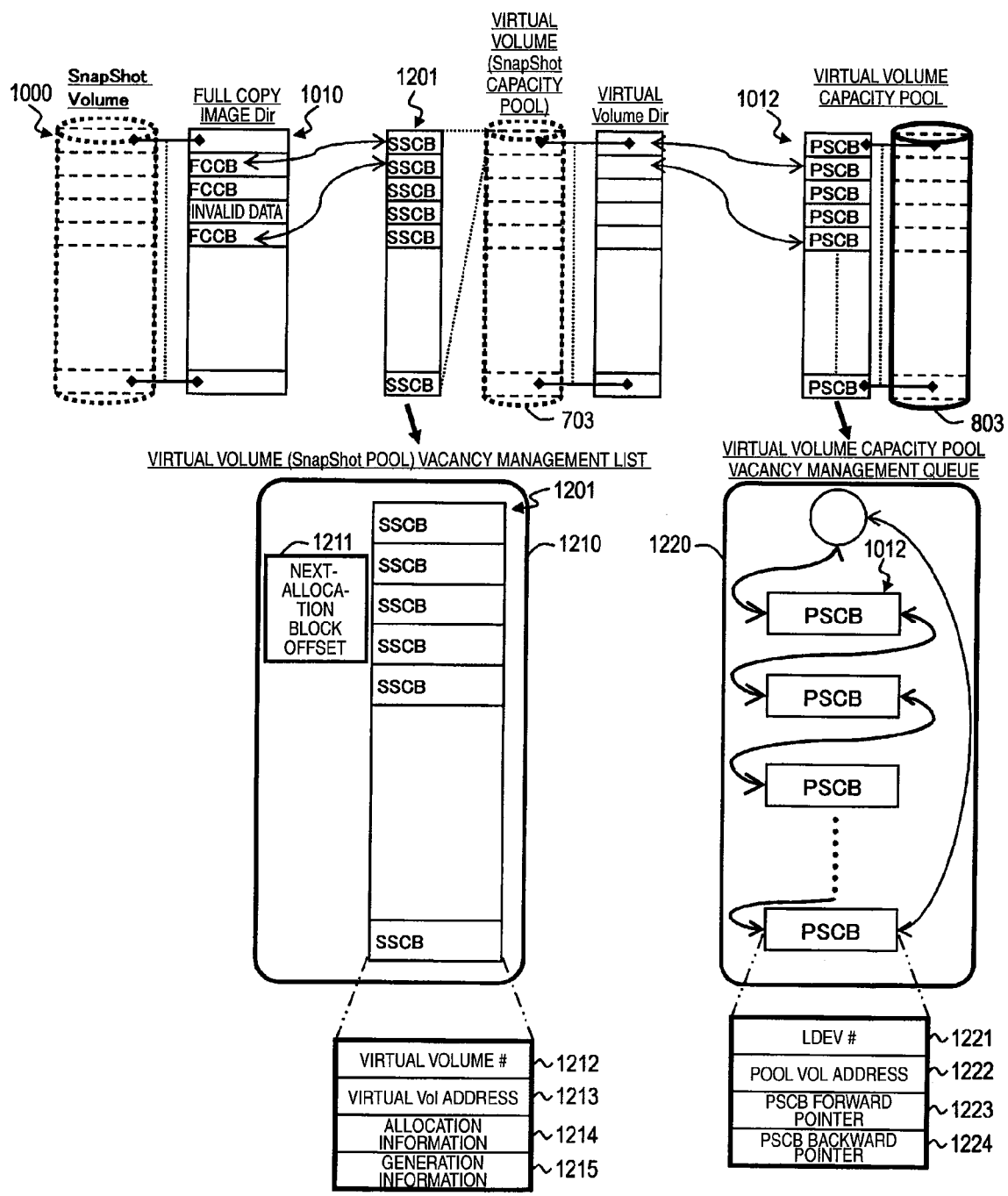
FIG. 12 is a diagram illustrating a direct access management table in the embodiment of the invention.

FIG. 12 is a diagram illustrating the direct access management table 1102 in the embodiment of the invention.

As described by referring to FIG. 10, the SVOL image directory 1000 is correlated to the full copy image directory 1010. To be more specific, the VVOLDIRs 1001 in the SVOL image directory 1000 are respectively correlated to the FCCBs 1011 in the full copy image directory 1010.

The FCCBs 1011 are respectively correlated to SSCBs (SnapShot Control Blocks) 1201. However, no SSCB 1201 is allocated to any of the FCCBs 1011 correlated to the logical block written with data of a specific pattern. If this is the case, the value of a pointer in the FCCB 1011 for establishing a correlation between the FCCB 1011 and the SSCB 1201 will be null.

The SSCB 1201 is management information for use to manage the memory area provided by the snapshot capacity pool 703. One SSCB corresponds to the memory area of a predetermined size in the snapshot capacity pool 703, in other words, the address range of a predetermined length. The memory area of a predetermined size as such is a unit of allocation to the memory area of the virtual volume capacity pool 803 to the snapshot capacity pool 703.

As described in the foregoing, the memory area in the snapshot capacity pool 703 is allocated with, as appropriate, the memory area in the virtual volume capacity pool 803. At this time, the memory area in the snapshot capacity pool 703 being an allocation destination is under the management of a snapshot capacity pool vacancy management list 1210 that will be described later. On the other hand, the memory area in the virtual volume capacity pool 803 for allocation is under the management of a virtual volume capacity pool vacancy management queue 1220 that will be described later.

The SSCBs 1201 each include a virtual volume number 1212, a virtual volume address 1213, allocation information 1214, and generation information 1215.

The virtual volume number 1212 is an identifier of the snapshot capacity pool 703 under the management of each of the SSCBs 1201.

The virtual volume address 1213 is an address of the memory area corresponding to each of the SSCBs 1201 in the snapshot capacity pool 703.

The allocation information 1214 indicates whether any physical memory area, i.e., memory area of the virtual volume capacity pool 803, is allocated to the memory area to be identified by the virtual volume address 1213 or not.

The generation information 1215 is used for identifying the generation of a snapshot corresponding to the data stored in the memory area to be identified by the virtual volume address 1213. Such information for use to identify the generation of a snapshot includes a generation number of the snapshot, time information about when the snapshot is created, or an identifier of the SVOL corresponding to the snapshot, for example.

The SSCBs 1201 each also include information for correlating itself to any of the PSCBs 1012, and information for correlating itself to any other SSCB 1201. Such information for correlating the SSCB 1201 and the PSCB 1201 can be used as a basis to identify the memory area of the virtual volume capacity pool 803 allocated to the memory area in the snapshot capacity pool 703 corresponding to the SSCB 1201. Moreover, such information for correlating the SSCB 1201 and any other SSCB 1201 can be used as a basis to identify the SSCB 1201 being of a generation subsequent to the SSCB 1201.

The memory area of the snapshot capacity pool 703 is allocated, as appropriate, with the memory area of the virtual volume capacity pool 803. This area allocation is performed in the order of the address of the memory area in the snapshot capacity pool 703. In this case, such allocation of the memory area is managed using the snapshot capacity pool vacancy management list 1210. The snapshot capacity pool vacancy management list 1210 includes a list of all of the SSCBs 1201 corresponding to the entire memory area of the snapshot capacity pool 703, and a block offset 1211 for the next allocation. The list of all of the SSCBs 1201 may be configured to include the virtual volume number 1212 and the virtual volume address 1213 in this order, for example.

When the memory area of the snapshot capacity pool 703 is not at all allocated with the memory area of the virtual volume capacity pool 803, the allocation information 1214 about all of the SSCBs 1201 takes a value of "not yet allocated, and the next-allocation block offset 1211 takes a value indicating the SSCB 1201 at the top of the list.

When there needs to firstly allocate the memory area of the virtual volume capacity pool 803 to the memory area of the snapshot capacity pool 703, the memory area indicated by the next-allocation block offset 1211, i.e., the memory area corresponding to the SSCB 1201 at the top of the list, is allocated with the memory area of the virtual volume capacity pool 803. At this time, the allocation information 1214 about the SSCB 1201 at the top of the list is updated in value to "allocated", and the next-allocation block offset 1211 is changed in value to indicate the SSCB 1201 located at the second in the list.

Thereafter, when there still needs allocation, similarly to the above, the memory area indicated by the next-allocation block offset 1211 is allocated with the memory area of the virtual volume capacity pool 803. As such, allocation is performed in the order of list entry.

On the other hand, the memory area of the virtual volume capacity pool 803 to be allocated to the snapshot capacity pool 703 is under the management of the virtual volume capacity pool vacancy management queue 1220. The virtual volume capacity pool vacancy management queue 1220 is configured by a plurality of PSCBs 1012 correlated to one another by a pointer.

The PSCBs 1012 each include an LDEV number 1221, a pool volume address 1222, a PSCB forward pointer 1223, and a PSCB backward pointer 1224. The LDEV number 1221 is an identifier of the LDEV 802 corresponding to each of the PSCBs 1012, i.e., pool volumes configuring the virtual volume capacity pool 803. The pool volume address 1222 is the address of the memory area of a predetermined size in the LDEV 802 corresponding to each of the PSCBs 1012.

The PSCB forward pointer 1223 and the PSCB backward pointer 1224 respectively indicate the memory areas allocated front and rear of the memory area corresponding to each of the PSCBs 1012. Exemplified here is a case where the PSCB forward pointer 1223 of any of the PSCBs 1012 (referred to as first PSCB in this example) indicates another PSCB 1012 (referred herein to as second PSCB), and the PSCB backward pointer 1224 of the first PSCB 1012 indicates still another PSCB 1012 (referred herein to as third PSCB). In such a case, after the memory area corresponding to the second PSCB 1012 is allocated to the snapshot capacity pool 703, the memory area corresponding to the first PSCB 1012 is allocated to the snapshot capacity pool 703, and then the memory area corresponding to the third PSCB 1012 is allocated to the snapshot capacity pool 703.

Figure 13:
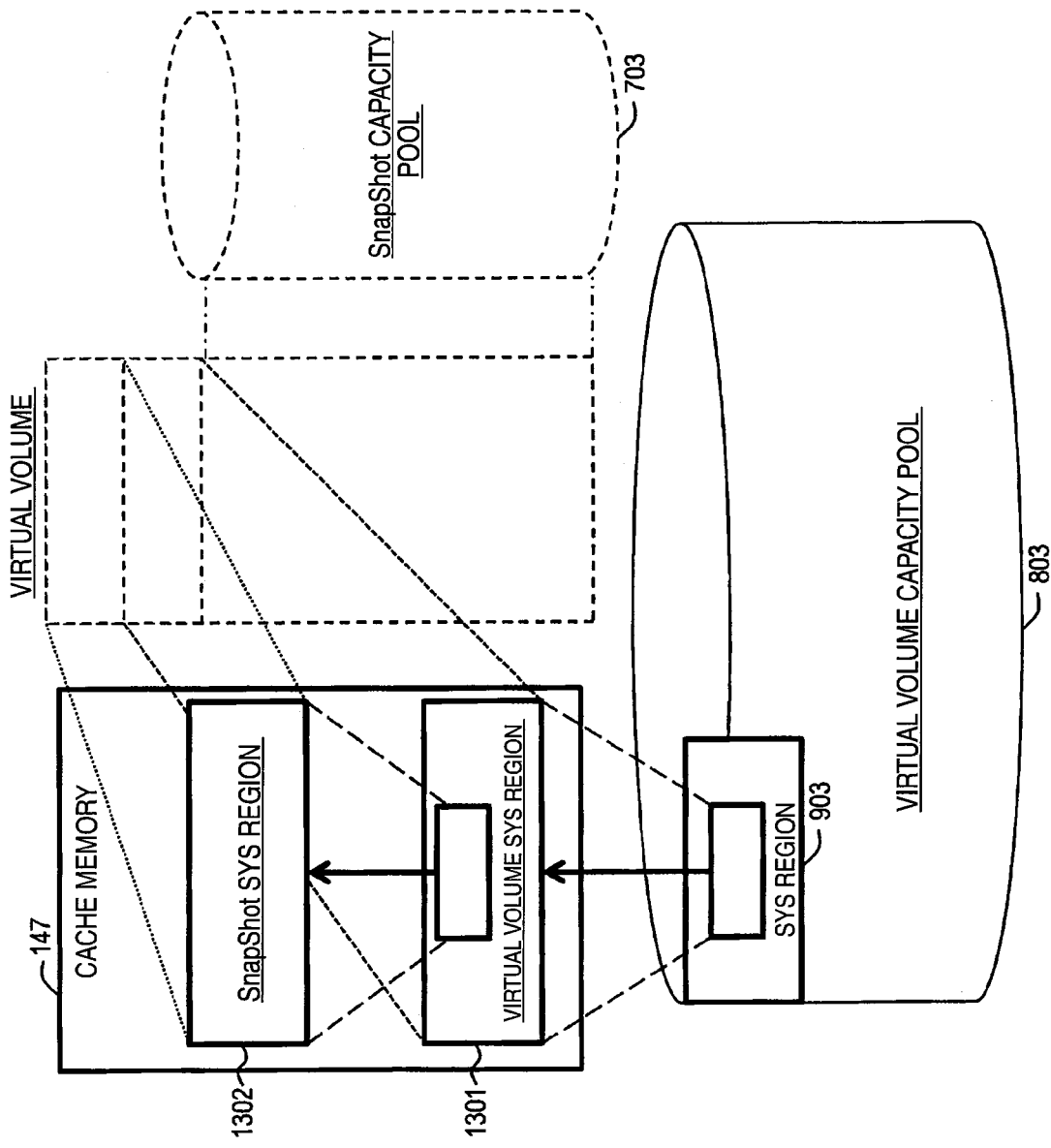
FIG. 13 is a diagram illustrating expansion of the SYS region in the embodiment of the invention.

FIG. 13 is a diagram illustrating expansion of the SYS region 903 in the embodiment of the invention.

While the first storage system 125 is being turned OFF, more specifically, while the cache memory 147 is not being provided with power, the SYS region 903 is stored in the virtual volume capacity pool 803 allocated to the snapshot capacity pool 703.

When the first storage system 125 is turned ON, and when a power supply is responsively started to the cache memory 147, the direct access management table 1102 stored in the SYS region 903 is expanded in the cache memory 147. To be specific, in the SYS region 903, a virtual volume SYS region 1301 is expanded in the cache memory 147, and a snapshot SYS region 1302 is also expanded in the cache memory 147.

The snapshot SYS region 1302 stores therein information for use to manage the correlation between the SVOLs 702 and the snapshot capacity pool 703. To be specific, out of the information found in the direct access management table 1102, the snapshot SYS region 1302 at least stores therein the information correlating the VVOLDIRs 1001 and the SSCBs 1201.

The virtual volume SYS region 1301 stores therein information for use to manage the correlation between the snapshot capacity pool 703 and the virtual volume capacity pool 803. To be specific, out of the information found in the direct access management table 1102, the virtual volume SYS region 1301 at least stores therein the information correlating the SSCBs 1201 and the PSCBs 1012.

Based on the information stored in the snapshot SYS region 1302 and that in the virtual volume SYS region 1301, the snapshot capacity volume 703 is provided.

Figure 14:
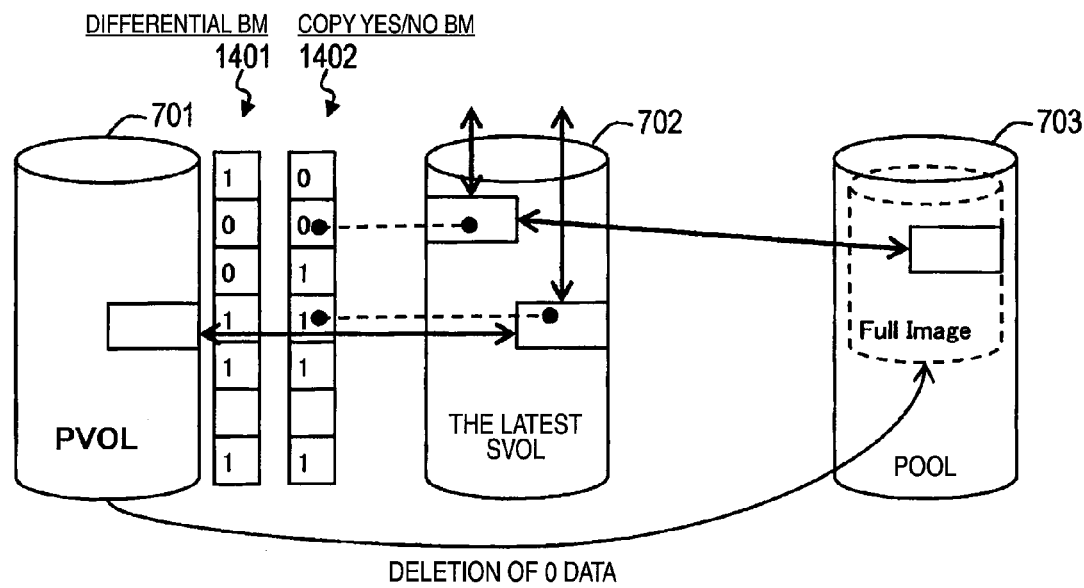
FIG. 14 is a diagram illustrating an access to an SVOL being the latest in the embodiment of the invention.

FIG. 14 is a diagram illustrating an access to the SVOL 702 being the latest in the embodiment of the invention.

The latest SVOL 702 is the one created in response to the latest snapshot creation request. For example, in FIG. 10, the SVOL 702A is created in response to the snapshot creation request at time 10:00, the SVOL 702B is created in response to the snapshot creation request at time 11:00, and the SVOL 702C is created in response to the snapshot creation request at time 12:00. When the current time is after time 12:00, and when no snapshot of a new generation is created after time 12:00, the SVOL 702C is the latest SVOL 702.

For creation of the SVOL 702, the reference is made to a differential bitmap (BM) 1401, and a copy YES/NO bitmap (BM) 1402. These bitmaps are stored in the SYS region 903, for example.

The differential BM 1401 includes a plurality of bits. In the below, the bits included in the differential BM 1401 are each referred to also as a differential bit. The differential bits each correspond to the memory area of a predetermined size in the PVOL 701. In the below, the memory area of a predetermined size corresponding to one differential bit is referred to as management block. When the memory area in the logical volume is managed using a logical block address, the management blocks may be each a logical block, or may be configured by a plurality of (predetermined number of) logical blocks.

The value of each of the differential bits indicates whether the data of the management block corresponding to the differential bit has been updated or not. For example, when the differential bit shows a value of "1", it may mean that the data has been updated, and when the differential bit shows a value of "0", it may mean that the data has not been updated.

The copy YES/NO BM 1402 includes a plurality of bits. In the below, the bits included in the copy YES/NO BM 1402 are each referred to also as a copy YES/NO bit. Similarly to the differential bits, the copy YES/NO bits respectively correspond to the management blocks in the PVOL 701. The value of each of the copy YES/NO bits indicates whether the data of the management block corresponding thereto is required to be copied into the snapshot capacity pool 703 or not. For example, when the copy YES/NO bit shows a value of "1", it may mean that the data is required to be copied, and when the copy YES/NO bit shows a value of "0", it may mean that the data is not required to be copied.

Described now is a process for the first storage system 125 to create an SVOL in response to a snapshot creation request.

As an example, the first storage system 125 receives, at time 10:00, a snapshot creation request in which the PVOL 701 is a target. At the time of receiving the snapshot creation request, the first storage system 125 updates all of the bits in the differential BM 1401 to the value of "0". When the snapshot creation request is asking for creation of a snapshot of a first generation for the PVOL 701, the first storage system 125 updates all of the bits in the copy YES/NO BM 1402 to the value of "1" at the time of receiving the snapshot creation request.

Thereafter, from the PVOL 701, the first storage system 125 reads the data stored in the management block corresponding to the copy YES/NO bit with a value of "1", and writes the data read as such into the snapshot capacity pool 703. This accordingly saves the data having been stored in the management block at the time of reception of the snapshot creation request into the snapshot capacity pool 703. After such saving of data, i.e., copying of data from the PVOL 701 to the snapshot capacity pool 703, the copy YES/NO bit corresponding to the management block is updated to the value of "0".

As described above, when the snapshot creation request is received for the first time, the copy YES/NO bits are entirely updated in value to "1", and thus the entire data stored in the PVOL at the time is saved into the snapshot capacity pool 703.

Note here that, as described by referring to FIG. 9, when the data read from the management block is of a specific pattern, the procedure may skip the writing of the data into the snapshot capacity pool 703.

Described next are processes to be executed by the first storage system 125 after receiving a data write and read request to/from the PVOL 701.

Such reading from the PVOL 701 and writing into the snapshot capacity pool 703 are performed in the access background to the PVOL 701 in a general manner, i.e., by the application server 101. As such, there is a possibility that the application server 101 may forward a write request toward the address in any of the management blocks not yet through with data saving. If such a write request updates any data not yet through with saving, this prevents the SVOL 702 including the data from being created.

Accordingly, upon reception of a write request to the PVOL 701, the first storage system 125 determines whether the copy YES/NO bit corresponding to the management block including the address designated as a write destination is showing the value of "1" or "0".

When the copy YES/NO bit is showing the value of "1", the first storage system 125 saves, into the snapshot capacity pool 703, the data of the management block corresponding to the copy YES/NO bit. The first storage system 125 then performs writing on request. Such data saving is referred to also as "preceding copying" in the below. The first storage system 125 then updates the differential bit corresponding to the management block through with writing to the value of "1", and the copy YES/NO bit to the value of "0".

On the other hand, when the copy YES/NO bit is showing the value of "0", the first storage system 125 performs writing on request without performing the data saving, and updates the differential bit corresponding to the management block through with the writing to the value of "1".

Note here that the data reading from the PVOL 701 is performed similarly to the general case irrespective of the value of the copy YES/NO bit.

Described next are processes to be executed by the first storage system 125 after receiving a data write and read request to/from the latest SVOL 702.

As described above, at the time when the first storage system 125 receives the snapshot creation request at time 10:00 but not the snapshot creation request for the next time, the SVOL 702A corresponding to the snapshot at time 10:00 is the SVOL 702 being the latest.

Upon reception of the write request to the latest SVOL 702, the first storage system 125 refers to the copy YES/NO bit corresponding to the write destination. When the copy YES/NO bit is showing the value of "1", the data of the management block of the PVOL 701 corresponding to the copy YES/NO bit is saved into the snapshot capacity pool 703, and then thus saved data is overwritten by the data on request. The first storage system 125 then updates the value of the copy YES/NO bit corresponding to the saved data to the value of "0".

On the other hand, when the copy YES/NO bit referred to as such is showing the value of "0", the first storage system 125 does not perform such data saving as above but performs writing of the data on request into the memory area of the snapshot capacity pool 703 corresponding to the address designated by the write request.

Upon reception of a read request for data reading from the latest SVOL 702, the first storage system 125 refers to the copy YES/NO bit corresponding to the address designated by the read request. When the copy YES/NO bit is showing the value of "1", the data of the management block of the PVOL 701 corresponding to the copy YES/NO bit is saved into the snapshot capacity pool 703. The first storage system 125 then performs data reading from the address of the PVOL 701 designated by the read request for transmission to the source of request.

On the other hand, when the copy YES/NO bit referred to as such is showing the value of "0", the first storage system 125 does not perform data saving as above but performs data reading from the address of the PVOL 701 designated by the read request for transmission to the source of request.

The detailed procedure for accessing the SVOL 702 as such will be described later (refer to FIGS. 23 to 25).

Figure 15:
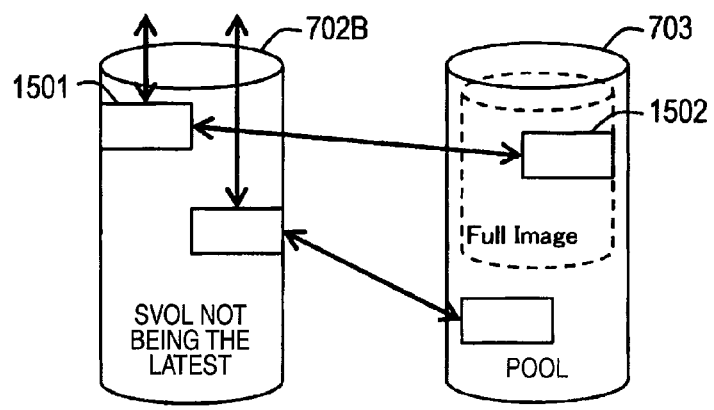
FIG. 15 is a diagram illustrating an access to an SVOL not being the latest in the embodiment of the invention.

FIG. 15 is a diagram illustrating an access to the SVOL 702 not being the latest in the embodiment of the invention.

As shown in FIG. 10, for example, when created are the SVOLs 702A, 702B, and 702C, and when the SVOL 702C is the SVOL 702 being the latest, it means that the SVOLs 702A and 702B are the SVOLs 702 not being the latest.

The SVOL 702 not being the latest is not correlated with the copy YES/NO BM 1402. Accordingly, for making an access to the SVOL 702 not being the latest, there is no need to refer to the copy YES/NO BM 1402, but when a write request comes for the data shared by the SVOLs 702 varying in generation, there needs to refer to the copy YES/NO BM 1402 not to lose the data of shared use.

For example, when the SVOL 702A of a first generation is created, and then when the SVOL 702B of the next generation, i.e., second generation, is created with no update of data at all of the management block including the PVOL 701, the data of the management block of the SVOL 702A corresponding to the management block, i.e., the data stored in the memory area in the snapshot capacity pool 703 corresponding to the management block of the SVOL 702A, is shared also by the SVOL 702B.

For example, when a management block 1501 of the SVOL 702B of FIG. 15 is correlated with a memory area 1502 in the snapshot capacity pool 703, if any new data is written into the management block 1501 in response to a write request made with respect to the SVOL 702B, the data stored in the memory area 1502 is accordingly updated. In this example, when the data having been stored in the memory area 1502 before such update is shared by the SVOLs 702A and 702B, due to the update of the memory area 1502, the SVOL 702A cannot be restored.

As such, when the memory area correlated to any management block including the address designated by the write request (hereinafter, such a management block is referred to as write-target management block) is shared by a plurality of generations, the first storage system 125 writes the data on request into the memory area available for use in the snapshot capacity pool 703. The first storage system 125 then newly establishes a correlation between the memory area and the write-target management block.

On the other hand, when the memory area of the snapshot capacity pool 703 correlated to the write-target management block is not shared by a plurality of generations, the first storage system 125 writes the data on request into the memory area.

When a request is provided for reading data from any of the addresses of the SVOL 702 not being the latest, the first storage system 125 performs data reading from the memory area of the snapshot capacity pool 703 correlated to the management block including the address on request, and makes a response to the source of request.

Figure 16B:
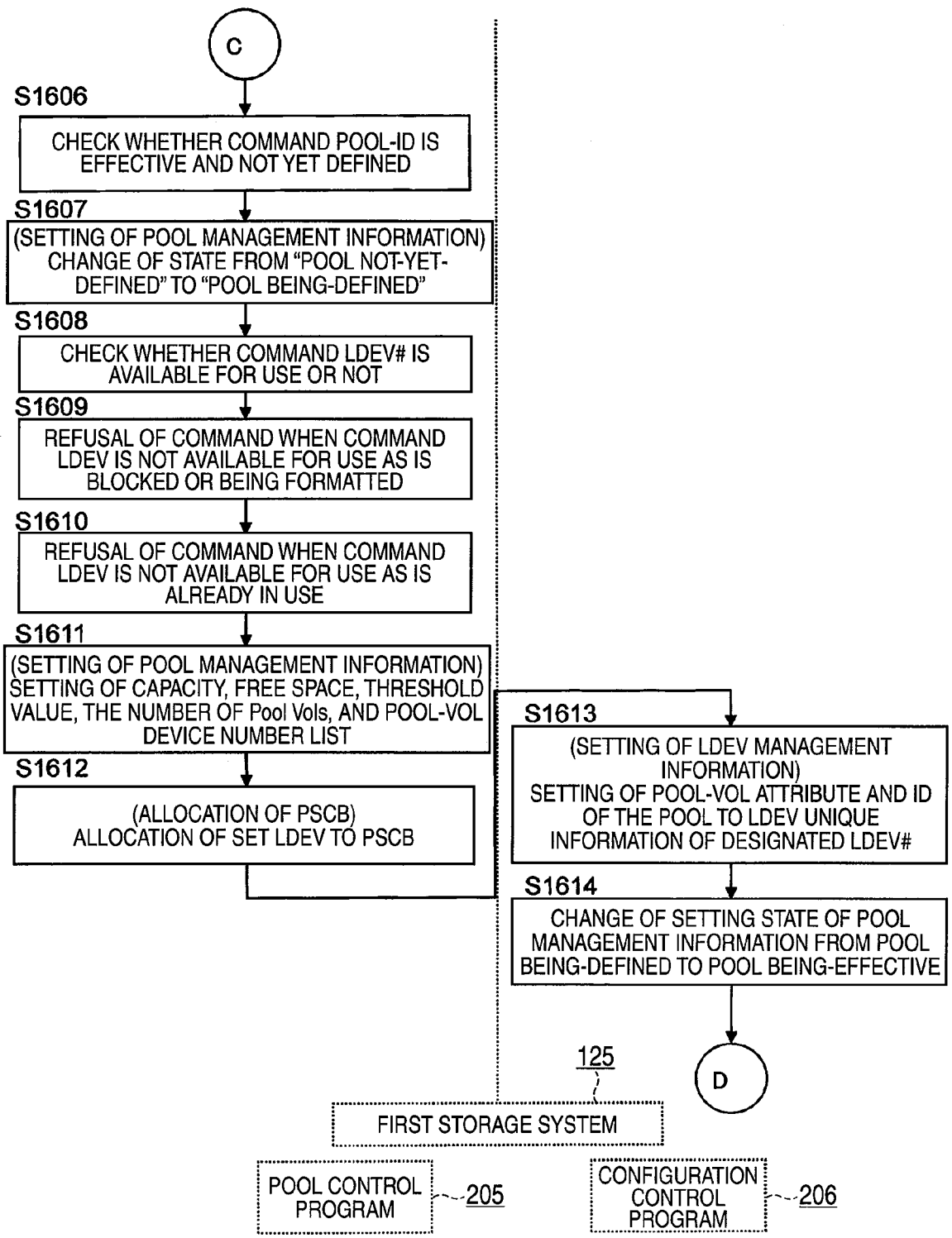
FIG. 16B is a second portion of the flowchart of the process to be executed for setting of the capacity pool in the embodiment of the invention.

FIGS. 16A and 16B are each the flowchart of a process to be executed for setting of a capacity pool in the embodiment of the invention.

To be specific, FIGS. 16A and 16B are each the flowchart of a process to be executed for setting of the virtual volume capacity pool 803. In the below, the processes of the flowcharts to be executed by the programs in the first storage system 125 are actually executed by the control processor(s) 143 running the programs.

The setting of the virtual volume capacity pool 803 is started by the management server 111.

First of all, an operator makes an input of information about the LDEV 802 to be correlated to the virtual volume capacity pool 803. To be specific, through operation of the input device 501, the operator makes inputs of a POOL ID, i.e., identifier of the virtual volume capacity pool 803, a threshold value, the number of the LDEVs 802 to be correlated, and an LDEV number for use to identify such an LDEV(s) 802 (S1601).

The management server 111 generates a instruction command for make the setting of a virtual volume capacity pool including the information input as such, and forwards the instruction command to the first storage system 125 via the network adaptor 506 (S1602).

In the first storage system 125, the instruction command provided by the management server 111 is received by the command control program 201 via the maintenance management terminal 153 (S1603).

The command control program 201 then checks the contents of thus received instruction command. When the contents of the instruction commandinstruction command are not valid, the command control program 201 refuses the instruction commandinstruction command (S1604).

Next, when the instruction commandinstruction command is for setting the virtual volume capacity pool 803, the command control program 201 passes the instruction commandinstruction command received as such to the pool control program 205. Upon reception of the instruction commandinstruction command, the pool control program 205 executes a capacity pool setting process (S1605).

First of all, the pool control program 205 determines whether the POOL-ID related to the instruction commandinstruction command is valid or not, and also determines whether the POOL-ID has been defined or not (S1606 of FIG. 16B).

When the POOL-ID related to the instruction commandinstruction command is valid, and when the POOL-ID is not yet defined, from the pool management information 221, the pool control program 205 acquires POOL unique information of the POOL-ID related to the instruction command. The pool control program 205 also enters information indicating that the POOL-ID is defined into the POOL management information (S1607).

The pool control program 205 checks whether the LDEV number related to the instruction command is available for use or not (S1608). To be specific, when the LDEV number related to the instruction command is blocked or is being formatted, it means that the LDEV number is not available for use, and the pool control program 205 thus refuses the command (S1609).

When the LDEV 802 related to the instruction command is already in use, e.g., when a path to the LDEV 802 is defined, when the LDEV 802 is used by a copy function or others, or when the LDEV 802 is reserved as a copy destination, it means that the LDEV is not available for use, and thus the pool control program 205 refuses the command (S1610).

The pool control program 205 then makes the setting of, to the POOL unique information in the pool management information 221, the capacity, the free space, the threshold value, the number of POOL-VOLs, and the POOL-VOL device list (S1611).

The pool control program 205 then performs allocations of the PSCB 1012 to the LDEV 802 correlated to the virtual volume capacity pool 803 (S1612).

By the pool control program 205 executing the process as such, the LDEV 802 is correlated to the virtual volume capacity pool 803.

After the setting of the virtual volume capacity pool 803, the configuration control program 206 makes the setting of the LDEV management information 222 (S1613). To be specific, the configuration control program 206 refers to the LDEV management information 222, and acquires the LDEV unique information (not shown) corresponding to the LDEV 802 allocated to the virtual volume capacity pool 803. The configuration control program 206 makes the setting of POOL-VOL attribute as the device attribute of the acquired LDEV unique information. The POOL-VOL attribute is information indicating that the LDEV 802 is being correlated to the virtual volume capacity pool 803. The configuration control program 206 then makes the setting of POOL-ID related to the instruction command to the POOL-ID (not shown) of the LDEV management information 222.

The configuration control program 206 then sets the state of the POOL-ID of the pool management information 221 to "POOL being-effective" (S1614). The configuration control program 206 then forwards a notification of command completion to the management server 111 (S1615 of FIG. 16A).

When the management server 111 receives the response notification from the first storage system 125 (S1616), this is the end of the process.

Such a process correlates the LDEV 802 to the virtual volume capacity pool 803.

Figure 17:
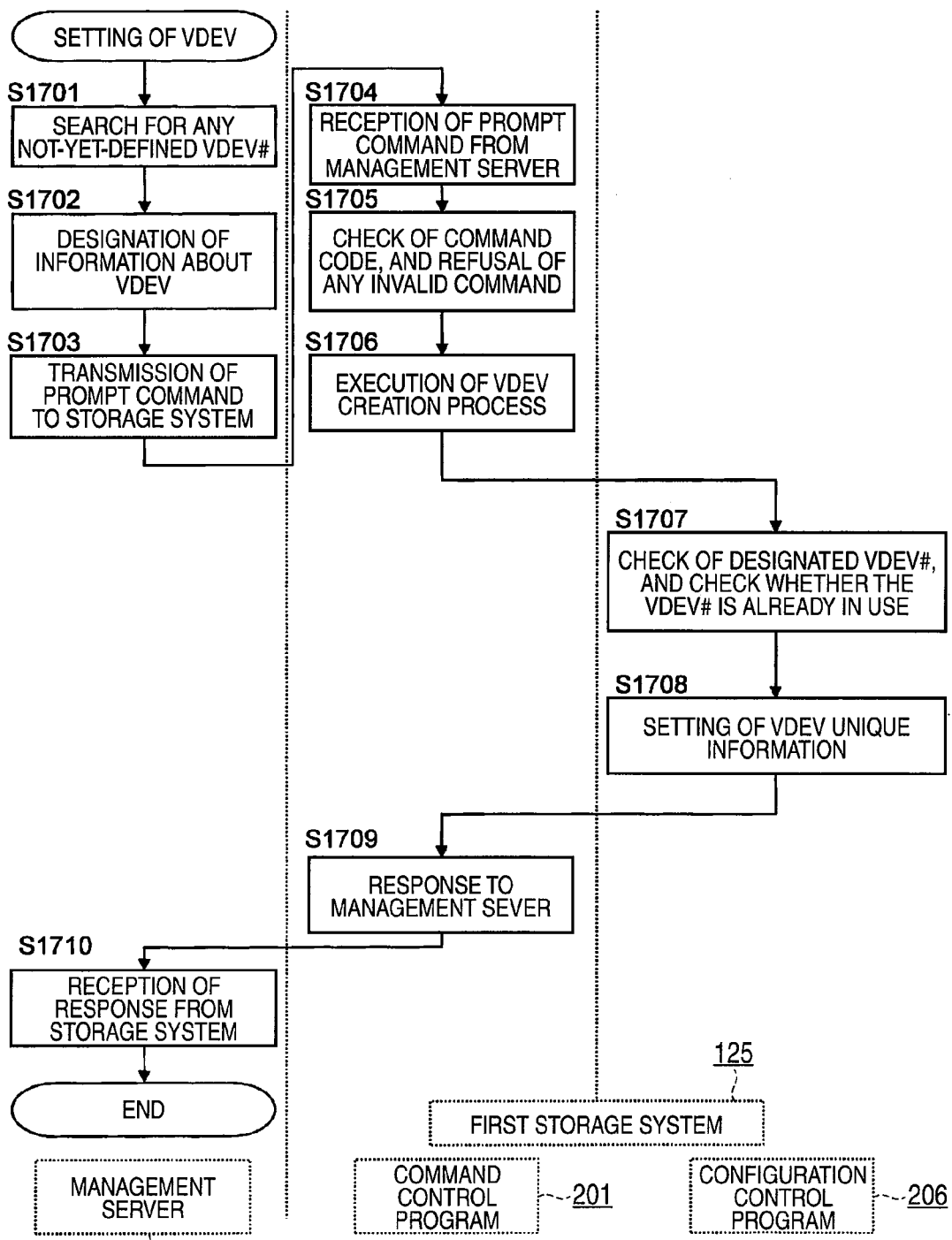
FIG. 17 is the flowchart of a process to be executed for setting of a VDEV in the embodiment of the invention.

FIG. 17 is the flowchart of a process to be executed for setting of the VDEV 801 in the embodiment of the invention.

First of all, the management server 111 makes a search of storage system configuration information (not shown) stored in the memory thereof, and acquires the number of any VDEV 801 not yet defined, i.e., VDEV#(S1701).

Through operation of the input device 501, the operator makes the setting of information about the VDEV 801 (S1702). At this time, the operator makes designations of information about the RAID group of the PDEVs 151 allocated to the VDEV 801, and the emulation type thereof.

The management server 111 generates a instruction command for creating a VDEV including any information set as such, and forwards the resulting instruction command to the first storage system 125 (S1703).

In the first storage system 125, the instruction command provided by the management server 111 is received by the command control program 201 via the maintenance management terminal 153 (S1704). The command control program 201 then checks the contents of the instruction command. When the contents of the instruction command are not valid, the command control program 201 refuses the instruction command (S1705).

When the instruction command is for setting of the VDEV 801, the command control program 201 passes the instruction command to the configuration control program 206. After receiving the instruction command, the configuration control program 206 executes a VDEV creation process (S1706).

The configuration control program 206 checks whether the VDEV number related to the instruction command is the one already in use or not (S1707). When the VDEV number related to the instruction command is the one already in use, the configuration control program 206 refuses the instruction command.

The configuration control program 206 then newly creates the VDEV unique information to the VDEV management information 223. To the VDEV unique information, the configuration control program 206 sets information about the VDEV related to the instruction command (S1708). To be specific, based on the capacity of the RAID group on request, the configuration control program 206 sets, to the VDEV unique information, the entire size of the capacity, the remaining size of the capacity, and the emulation type. This accordingly sets the VDEV 801 related to the instruction command. When the VDEV 801 is set to the virtual volume, the device attribute is set to "virtual volume".

After completion of the VDEV creation process as such, the command control program 201 forwards a notification of command completion to the management server 111 (S1709).

When the management server 111 receives the response notification from the first storage system 125 (S1710), this is the end of the process.

Such a process accordingly sets the VDEV 801.

Figure 18:
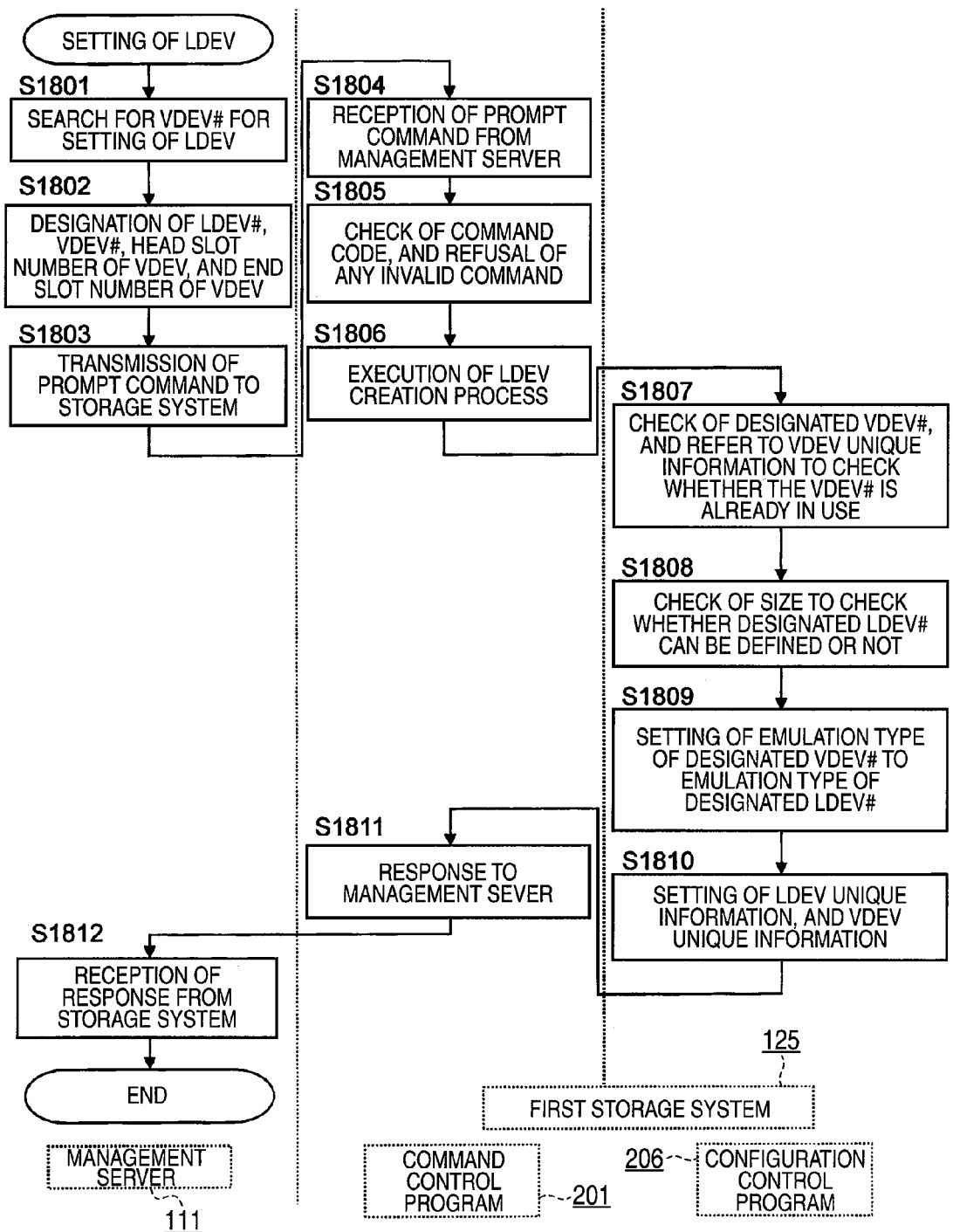
FIG. 18 is the flowchart of a process to be executed for setting of an LDEV in the embodiment of the invention.

FIG. 18 is the flowchart of a process to be executed for setting of the LDEV 802 in the embodiment of the invention.

This process is executed for setting of the LDEV 802 being a memory area to the VDEV 801, i.e., for establishing a correlation therebetween. Note here that the VDEV 801 of this process may be the VDEV 801 set in the process of FIG. 17, or the VDEV 801 that has been already set.

First of all, the management server 111 acquires the number of the VDEV 801 correlated to the LDEV 802, i.e., VDEV# (S1801). As the VDEV number, the management server 111 automatically sets the VDEV number set in the process of FIG. 17. Alternatively, the operator may set any VDEV number that has been already set.

Through operation of the input device 501, the operator then designates information about the LDEV 802 for setting. To be specific, the operator designates such information for setting as the LDEV number, the VDEV number, the head slot number of the VDEV 801, and the end slot number of the VDEV 801 (S1802).

The management server 111 then generates a instruction command for setting of an LDEV including the information designated by the operator as such, and forwards the resulting instruction command to the first storage system 125 (S1803).

In the first storage system 125, the instruction command provided by the management server 111 is received by the command control program 201 via the maintenance management terminal 153 (S1804).

The command control program 201 then checks the contents of the instruction command provided as such. When the contents of the instruction command are not valid, the command control program 201 refuses the instruction command (S1805).

Next, when the instruction command is for setting of the LDEV, the command control program 201 passes the instruction command received as such to the configuration control program 206. After receiving the instruction command, the configuration control program 206 executes the LDEV setting process (S1806).

The configuration control program 206 then checks whether the VDEV number related to the instruction command is the one already in use or not (S1807). When the VDEV number related to the instruction command is the one already in use, the configuration control program 206 refuses the instruction command.

The configuration control program 206 then acquires the entire size of the VDEV 801 related to the instruction command from the VDEV management information 223. The configuration control program 206 then checks whether the size of the LDEV 802 related to the instruction command can be defined to the VDEV 801 or not (S1808). The size of the LDEV 802 can be calculated from the head slot number and the end slot number of the instruction command. When the LDEV 802 cannot be defined, the configuration control program 206 refuses the instruction command.

The configuration control program 206 then acquires, from the VDEV unique information, the emulation type of the VDEV 801 related to the instruction command. This emulation type is set as the emulation type of the LDEV 802 related to the instruction command (S1809).

The configuration control program 206 then sets the LDEV unique information of the LDEV number related to the instruction command. The configuration control program 206 then sets the VDEV unique information of the VDEV number related to the instruction command (S1810).

To be specific, the configuration control program 206 newly creates the LDEV unique information of the LDEV number related to the instruction command. The configuration control program 206 then make definitions of the LDEV unique information, i.e., the LDEV number, the head slot number, the end slot number, and the device attribute. After the setting of the LDEV unique information as such, the configuration control program 206 sets the VDEV unique information of the VDEV number related to the instruction command. To be specific, the configuration control program 206 adds the set number of the LDEVs, and makes the setting of information related to the instruction command, i.e., the LDEV number, the remaining size of the capacity, the head LDEV slot, and the end LDEV slot. This accordingly correlates the LDEV related to the instruction command to the VDEV.

After completion of the process of LDEV setting as such, the command control program 201 forwards a notification of command completion to the management server 111 (S1811).

When the management server 111 receives the response notification from the first storage system 125 (S1812), this is the end of the process.

Such a process accordingly correlates the LDEV to the VDEV.

Note that the processes to be executed by the management server 111 in the flowcharts of FIGS. 16A to 18 above may be executed by the maintenance management terminal 153. If this is the case, the input device 601 is used for making inputs to the operator's maintenance management terminal 153, and communications between the maintenance management terminal 153 and the command control program 201 is carried out over the network adaptor 606.

Figure 19:
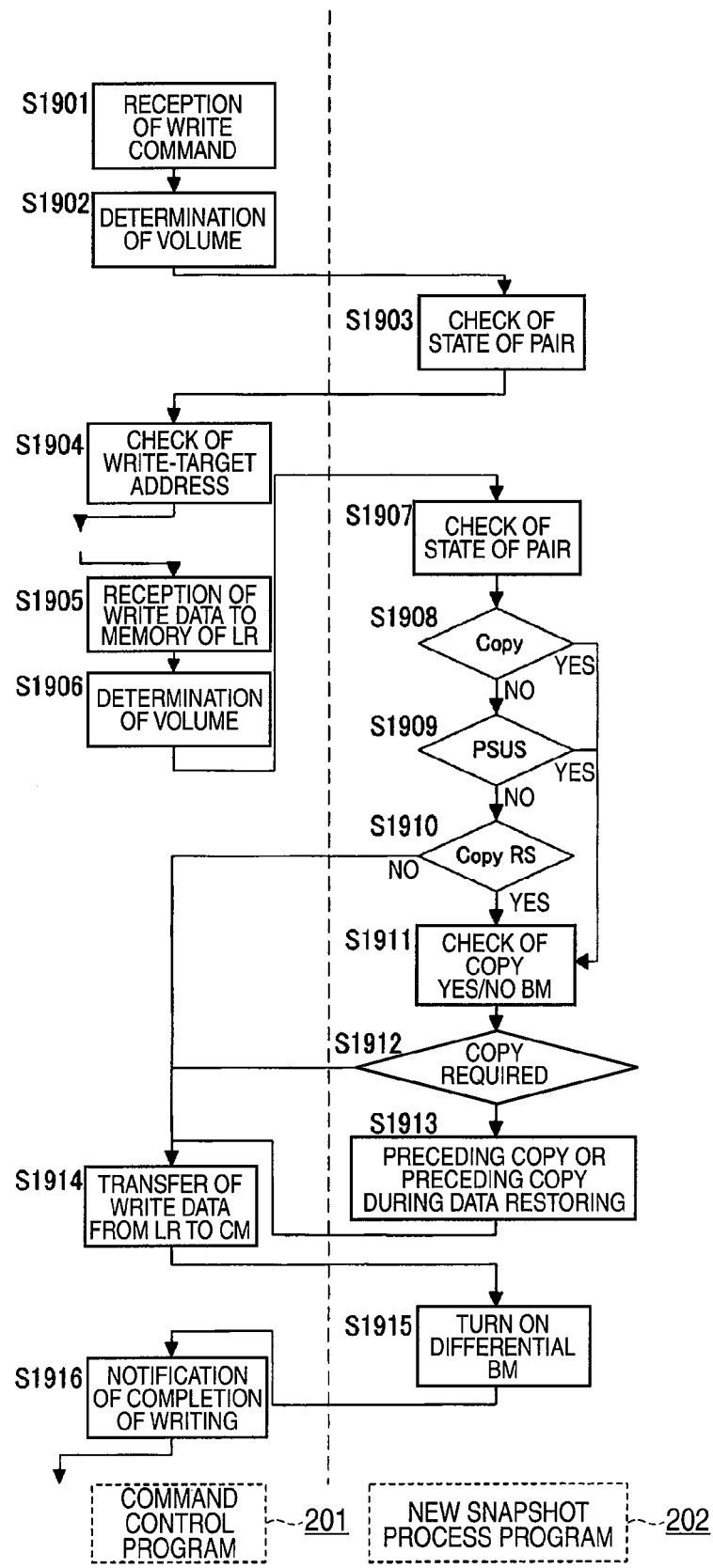
FIG. 19 is a diagram illustrating a data write process to be executed to a PVOL in the embodiment of the invention.

FIG. 19 is a diagram illustrating a data write process to the PVOL 701 to be executed in the embodiment of the invention.

When the command control program 201 of the first storage system 125 receives a write command with the PVOL 701 being a target from the application server 101 or others, i.e., command asking for data writing, a write process of FIG. 19 is started (S1901).

The command control program 201 then determines which of the logical volumes is designated as a write destination of data by the write command (S1902). In FIG. 19 example, the PVOL 701 is designated as a write destination.

The new snapshot process program 202 then checks the state of a pair including the PVOL 701 designated as such (S1903). The information indicating the state of such a pair is found in the pair management information 224.

The command control program 201 then checks the address designated by the write command as a data write destination (S1904). Such an address is hereinafter referred to as write-target address. In FIG. 19 example, the address in the PVOL 701 is designated.

The command control program 201 then receives the data asked for writing by the write command (hereinafter, referred to as write data), and stores the write data into the memory 131 of the LR 133 (S1905).

The command control program 201 then determines which of the logical volumes is designated as a data write destination by the write command (S1906).

The new snapshot process program 202 then checks the state of the pair (S1907).

The new snapshot process program 202 then determines whether the pair is in the state of "Copy" or not, i.e., in the state in which the initial copy is in progress (S1908). This initial copy is a process for copying the entire data (except data of a specific pattern) stored in the PVOL 701 into the SVOL 702 for creation of snapshot of a first generation. More in detail, the initial copy is a process for copying of data as the full copy 901 of the snapshot capacity pool 703 deleted with any data of a specific pattern.

When the pair is determined as being in the state of "Copy" in step S1908, the procedure goes to step S1911 that will be described later.

On the other hand, when the pair is determined as not being in the state of "Copy" in step S1908, the new snapshot process program 202 determines whether the pair is in the state of "PSUS" or not, i.e., in the state in which copying to the SVOL 702 is being stopped (S1909). When the pair is in the state of "PSUS", even if the PVOL 701 of the pair is written with the data, the writing is not reflected to the SVOL 702. Instead, the differential bit of the differential BM 1401 corresponding to the management block of the PVOL 701 written with the data is updated to the value of "1" (refer to FIG. 14).

When the pair is determined as being in the state of "PSUS" in step S1909, the procedure goes to step S1911 that will be described later.

On the other hand, in step S1909, when the pair is determined as not being in the state of "PSUS", the new snapshot process program 202 determines whether the pair is in the state of "Copy RS" or not, i.e., in the state in which copying is in progress for data restoring (S1910).

Data restoring is a process for restoring the PVOL 701 at the time when a snapshot of the designated generation is created. For data restoring as such, the data of the SVOL 702 corresponding to the designated generation is copied into the PVOL 701.

When the pair is determined as not being in the state of "Copy RS" in step S1910, the procedure goes to step S1914 that will be described later.

In any of the cases, i.e., when the pair is determined in step S1908 as being in the state of "Copy", when the pair is determined in step S1909 as being in the state of "PSUS", or when the pair is determined in step S1910 as being in the state of "Copy RS", the new snapshot process program 202 checks the copy YES/NO BM 1402 of the pair (S1911).

Based on the check result of the copy YES/NO BM 1402, the new snapshot process program 202 determines whether there needs to copy the data stored in the area corresponding to the write-target address or not (S1912). To be specific, when the copy YES/NO bit corresponding to the write-target address, i.e., the copy YES/NO bit corresponding to the management block including the area corresponding to the write-target address, is showing the value indicating that the data copying is required, e.g., the value of "1" in FIG. 14 example, the new snapshot process program 202 determines that there needs to copy the data stored in the area corresponding to the write-target address.

When the determination result in step S1912 is NO, i.e., data copying is not required, the procedure goes to step S1914 that will be described later.

On the other hand, when the determination result in step S1912 is YES, i.e., data copying is required, a preceding copy process is executed (S1913). The preceding copy process will be described later (refer to FIG. 20). Note here that when the pair is determined as being in the state of "Copy RS" in step S1910, and when the data copying is determined as being required in step S1912, in step S1913, as an alternative to the preceding copy process, a preceding copy process during data restoring is executed. The preceding copy process during data restoring will be described later (refer to FIG. 21).

In any of the cases, i.e., when the pair is determined in step S1910 as not being in the state of "Copy RS", when data copying is determined in step S1912 as not being required, or after completion of step S1913, the command control program 201 transfers the data stored in the memory 131 of the LR 133 into the cache memory 147 (S1914). The data transferred as such is then stored in the area in the PVOL 701 designated by the write-target address.

The new snapshot process program 202 then updates the differential bit of the differential BM 1401 corresponding to the write-target address to a value indicating that the data has been updated, i.e., the value of "1" in FIG. 14 example (S1915).

The command control program 201 then notifies the source of the write command that the data write process based on the write command is now completed (S1916).

This is the end of the data write process to the PVOL 701 in the embodiment of the invention.

Figure 20:
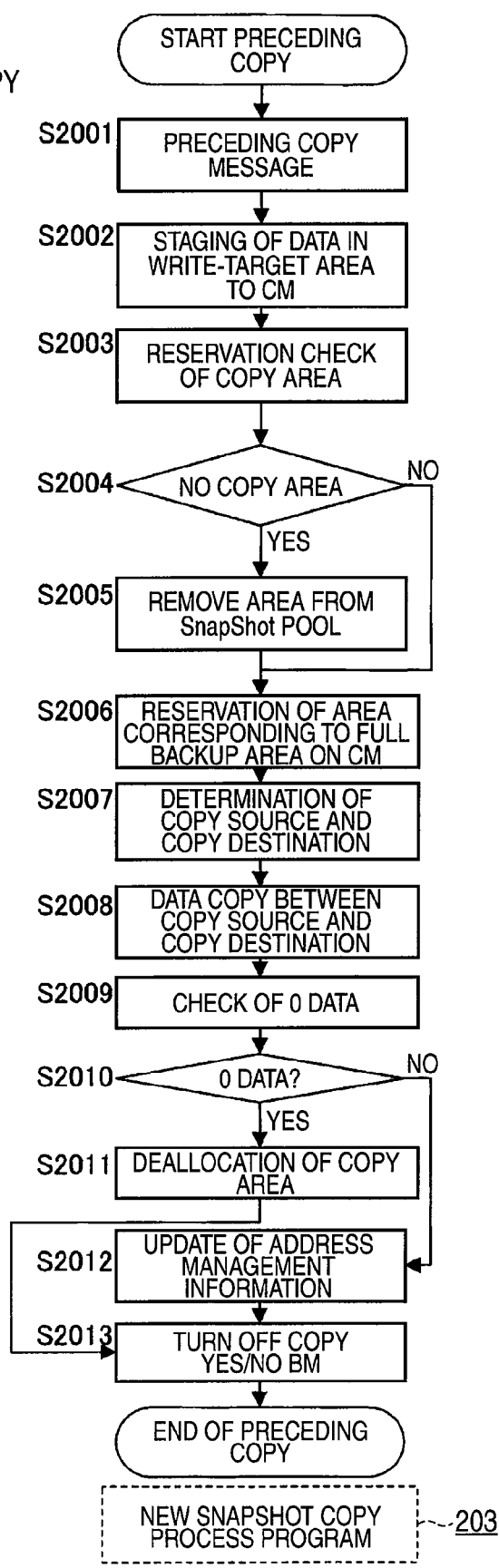
FIG. 20 is a diagram illustrating a preceding copy process to be executed at the time of data writing to a PVOL in the embodiment of the invention.

FIG. 20 is a diagram illustrating a preceding copy process to be executed at the time of data writing to the PVOL 701.

The preceding copy process of FIG. 20 is executed in step S1913 of FIG. 19 when the copy YES/NO bit is showing a value of "copy required" in S1912 of FIG. 19 with a target of the management block of the PVOL 701 corresponding to the copy YES/NO bit. In the below, the management block being a target for such a process is referred to as "write-target area".

When the preceding copy process is started, the new snapshot copy process program 203 forwards a preceding copy message (S2001).

The new snapshot copy process program 203 then reads the data stored in the write-target area of the PVOL 701 for storage into the cache memory 147, i.e., staging (S2002).

The new snapshot copy process program 203 then checks the area serving as a copy destination in the snapshot capacity pool 703 (S2003).

Based on the check result in step S2003, the snapshot copy process program 203 then determines whether the area serving as a copy destination is reserved in the snapshot capacity pool 703 or not (S2004).

When the determination in step S2004 is NO, i.e., the area as a copy destination is determined as not being reserved, the new snapshot copy process program 203 reserves any area in the snapshot capacity pool 703 for use as a copy destination (S2005).

After completion of step S2005, or when the determination result in step S2004 is YES, i.e., the area of copy destination is reserved, the new snapshot copy process program 203 reserves, on the cache memory 147, an area corresponding to a full backup area, i.e., full copy 901 (S2006).

The new snapshot copy process program 203 then determines a copy source and a copy destination (S2007), i.e., the data as a result of the staging in step S2002 is determined as being a copy source, and the area reserved in step S2006 is determined as being a copy destination.

The new snapshot copy process program 203 then performs data copying from the copy source to the copy destination determined as such (S2008). The data being a copying result on the cache memory 147 is then stored in the copy-destination area reserved in the snapshot capacity pool 703.

The new snapshot copy process program 203 then makes a comparison between the data being a copying result in step S2008 and the data of a predetermined specific pattern (S2009). Exemplified here is a case where the data of a specific pattern is configured only "0".

The new snapshot copy process program 203 determines whether the data being a copying result in step S2008 is configured only by "0" or not (S2010).

When the determination result in step S2010 is YES, i.e., the data is configured only by "0", the new snapshot copy process program 203 releases the area of the copy destination reserved in the snapshot capacity pool 703 (S2011). To be specific, this deallocates the memory area in the virtual volume capacity pool 803 with respect to the copy-destination area in the snapshot capacity pool 703.

On the other hand, when the determination result in step S2010 is NO, i.e., the data is not configured only by "0", the new snapshot copy process program 203 updates the address management information (S2012).

After completion of step S2011, or after completion of step S2012, the new snapshot copy process program 203 updates the copy YES/NO bit of the copy YES/NO BM 1402 corresponding to the write-target area to have a value indicating that data copying is not required, i.e., the value of "0" in FIG. 14 example (S2013).

This is the end of the preceding copy process.

Figure 21:
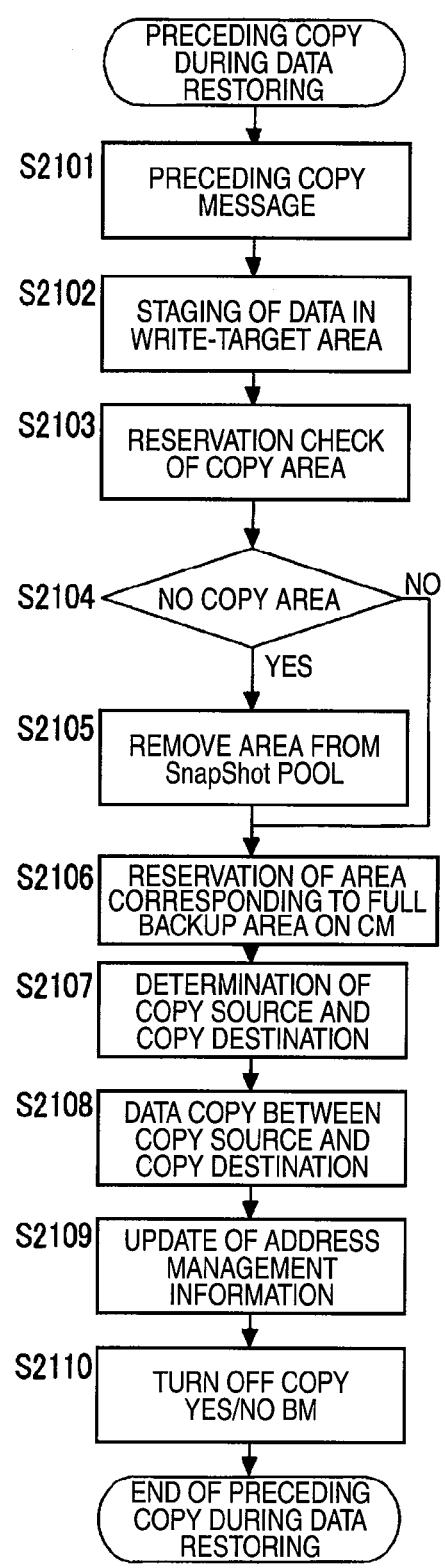
FIG. 21 is a diagram illustrating the preceding copy process to be executed during data restoring in the embodiment of the invention.

FIG. 21 is a diagram illustrating the preceding copy process to be executed during data restoring in the embodiment of the invention.

The preceding copy process during data restoring of FIG. 21 is executed in step S1913 of FIG. 19 when the pair is determined in step S1910 of FIG. 19 as being in the state of "Copy RS", and when the copy YES/NO bit is determined in step S1912 as having a value indicating "copy required". Such a preceding copy process is executed with respect to the management block corresponding to such a copy YES/NO bit.

In the flowchart of FIG. 21, steps S2101 to S2108 are respectively similar to steps S2001 to S2008 of FIG. 20, and thus are not described again. In the new snapshot copy process program 203, step S2109 is executed after step S2108, and then step S2110 is executed. Steps S2109 and S2110 are respectively similar to steps S2012 and S2013 of FIG. 20, and thus are not described again.

Note here that, in the process of FIG. 21, data copying is performed from the SVOL 702, i.e., so-called snapshot capacity pool 703, to the PVOL 701. To be specific, the write-target area in the process of FIG. 21 is the management block of the SVOL 702 corresponding to the copy YES/NO bit determined as "copy required" in S1912 of FIG. 19. In step S2102, the data stored in the write-target area in the SVOL 702 is staged into the cache memory 147. In steps S2103 to S2105, the area of the copy destination is reserved in the PVOL 701.

Figure 22:
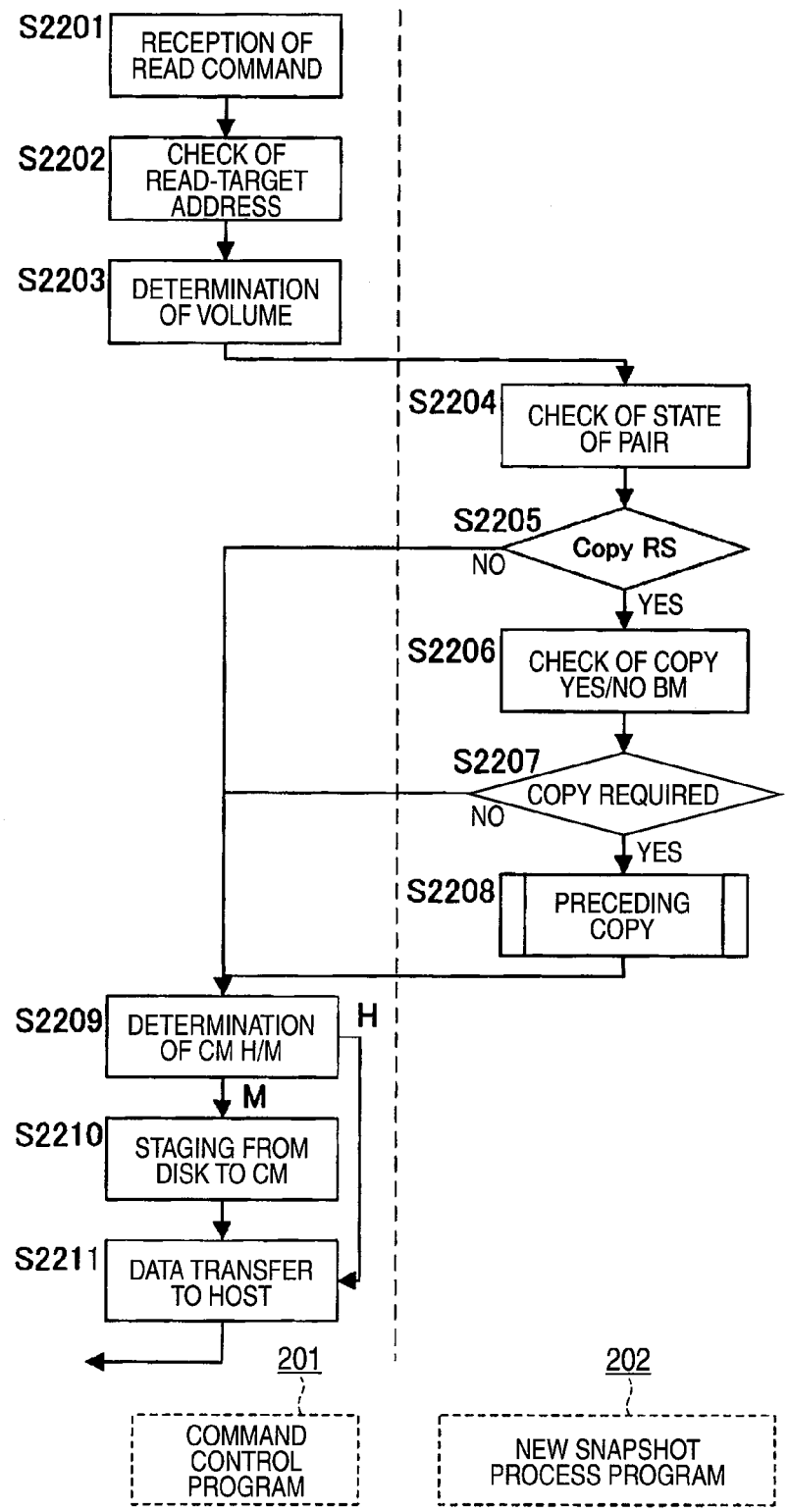
FIG. 22 is a diagram illustrating a data read process to be executed from a PVOL in the embodiment of the invention.

FIG. 22 is a diagram illustrating a data reading process to be executed from the PVOL 701 in the embodiment of the invention.

When the command control program 201 of the first storage system 125 receives a read command with a target of the PVOL 701 from the application server 101 or others, i.e., a command asking for data reading, the read process of FIG. 22 is started (S2201).

The command control program 201 then checks the address designated as a data read target by the read command (hereinafter, such an address is referred to as read-target address) (S2202). In FIG. 22 example, the address in the PVOL 701 is designated.

The command control program 201 then determines which of the logical volumes is designated as the data read target by the read command (S2203).

The new snapshot process program 202 then checks the state of a pair including the designated PVOL 701 (S2204).

The new snapshot process program 202 then determines whether the pair is in the state of "Copy RS" or not (S2205).

When the pair is determined in step S2205 as not being in the state of "Copy RS", the procedure goes to step S2209 that will be described later.

On the other hand, when the pair is determined in step S2205 as being in the state of "Copy RS", the new snapshot process program 202 checks the copy YES/NO BM 1402 of the pair (S2206).

Based on the check result of the copy YES/NO BM 1402, the new snapshot process program 202 determines whether there needs to copy the data stored in the area corresponding to the read-target address or not (S2207). This determination is made similarly to step S1912 of FIG. 19.

When the determination result in step S2207 is NO, i.e., data copying is not required, the procedure goes to step S2209 that will be described later.

On the other hand, when the determination result in step S2207 is YES, i.e., data copying is required, the preceding copy process during data restoring is executed (S2208). The preceding copy process during data restoring to be executed in step S2208 is the same as described by referring to FIG. 21.

When the pair is determined in step S2205 as not being in the state of "Copy RS", or after completion of step S2208, the command control program 201 determines whether there is a cache hit or not, i.e., whether the data stored in the read-target address is stored in the cache memory 147 or not (S2209).

When the determination result in step S2209 tells that there is a cache miss, the command control program 201 reads the data from the area of the PVOL 701 corresponding to the read-target address for storage into the cache memory 147 (S2210).

The command control program 201 then forwards the data read as such in step S2210 to the application server 101 (S2211).

On the other hand, when the determination result in step S2209 tells that there is a cache hit, the procedure skips step S2210, and the command control program 201 forwards the data read from the cache memory 147 to the application server 101 or others (S2211).

This is the end of the data read process from the PVOL 701.

Figure 23:
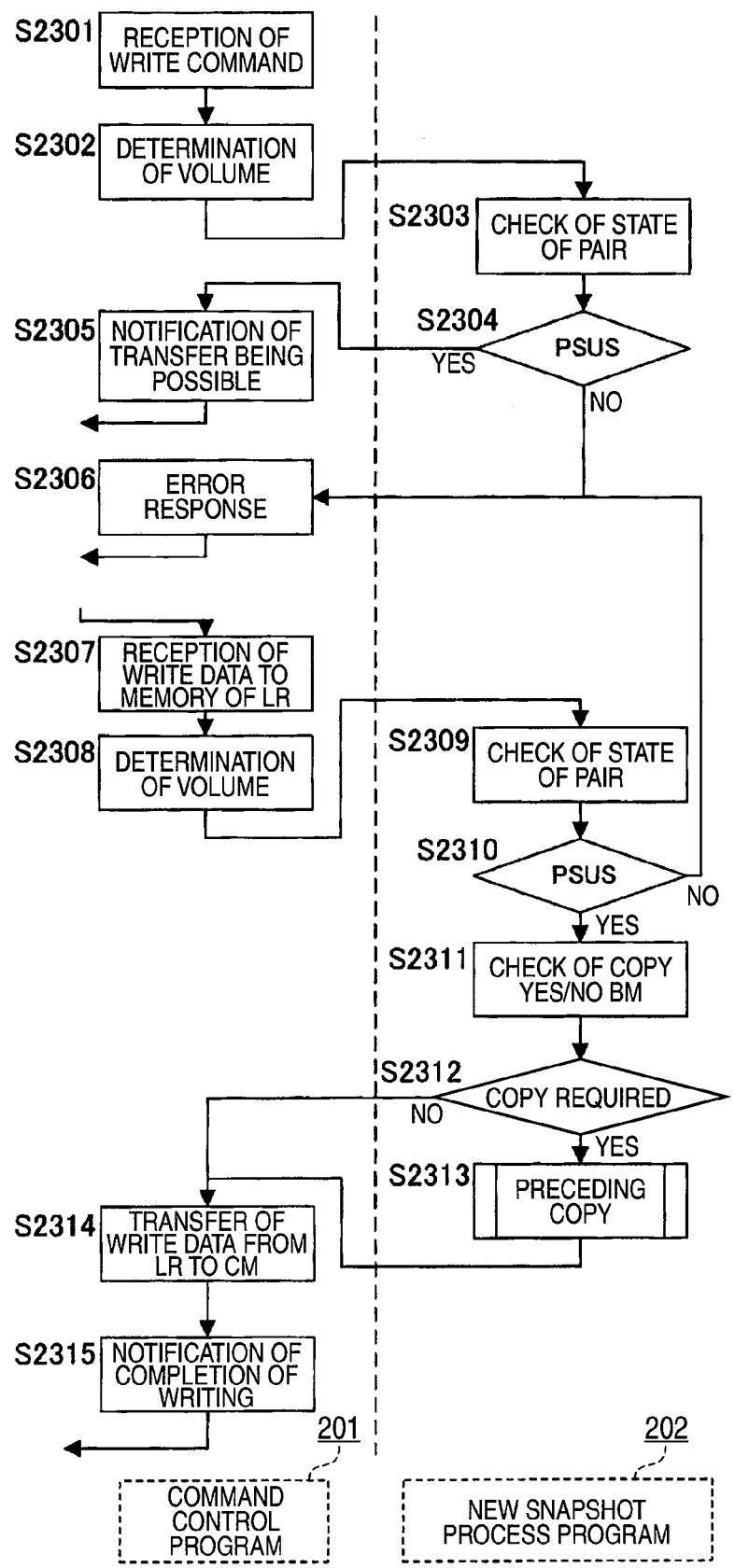
FIG. 23 is a diagram illustrating a data write process to be executed to an SVOL in the embodiment of the invention.

FIG. 23 is a diagram illustrating a data write process to be executed to the SVOL 702 in the embodiment of the invention.

When the command control program 201 of the first storage system 125 receives a write command with a target of the SVOL 702 from the backup server 102 or others, the data write process of FIG. 23 is started (S2301).

The command control program 201 then determines which of the logical volumes is designated as a data write designation by the write command (S2302). In FIG. 23 example, the SVOL 702 is designated as the write destination.

The new snapshot process program 202 then checks the state of a pair including the SVOL 702 designated as such (S2303).

The new snapshot process program 202 then determines whether the pair is in the state of "PSUS" or not (S2304).

When the pair is determined in step S2304 as not being in the state of "PSUS", the command control program 201 makes a response of error provided with a Check Status to the write command (S2306).

On the other hand, when the pair is determined in step S2304 as being in the state of "PSUS", the command control program 201 checks the write-target address, and makes a notification by a command response that the transfer is possible (S2305).

After completion of step S2305, the new snapshot process program 202 stores the write data into the memory 131 of the LR 133 (S2307).

The command control program 201 then determines which of the logical volumes is designated as a data write destination by the write command (S2308).

The new snapshot process program 202 then checks the state of the pair (S2309).

The new snapshot process program 202 then determines whether the pair is in the state of "PSUS" or not (S2310).

When the pair is determined in step S2310 as not being in the state of "PSUS", the command control program 201 makes a response of error provided with a Check Status to the write command (S2306).

On the other hand, when the pair is determined in step S2310 as being in the state of "PSUS", the new snapshot process program 202 checks the copy YES/NO BM 1402 of the pair (S2311).

Based on the check result of the copy YES/NO BM 1402, the new snapshot process program 202 determines whether there needs to copy the data stored in the area corresponding to the write-target address or not (S2312). This determination is made similarly to step S1912 of FIG. 19.

When the determination result in step S2312 is NO, i.e., data copying is not required, the procedure goes to step S2314 that will be described later.

On the other hand, when the determination result in step S2312 is YES, i.e., data copying is required, the preceding copy process is executed (S2313). The preceding copy process will be described later (refer to FIG. 24).

When the determination result is NO in step S2312, i.e., data copying is not required, or after completion of step S2313, the command control program 201 transfers the data stored in the memory 131 of the LR 133 to the cache memory 147 (S2314). The data transferred as such is stored in the area in the SVOL 702 designated by the write-target address, i.e., actually area corresponding to the snapshot capacity pool 703.

The command control program 201 then notifies the source of the write command that the data write process based on the write command is completed (S2315).

This is the end of the data write process to the SVOL 702.

Figure 24:
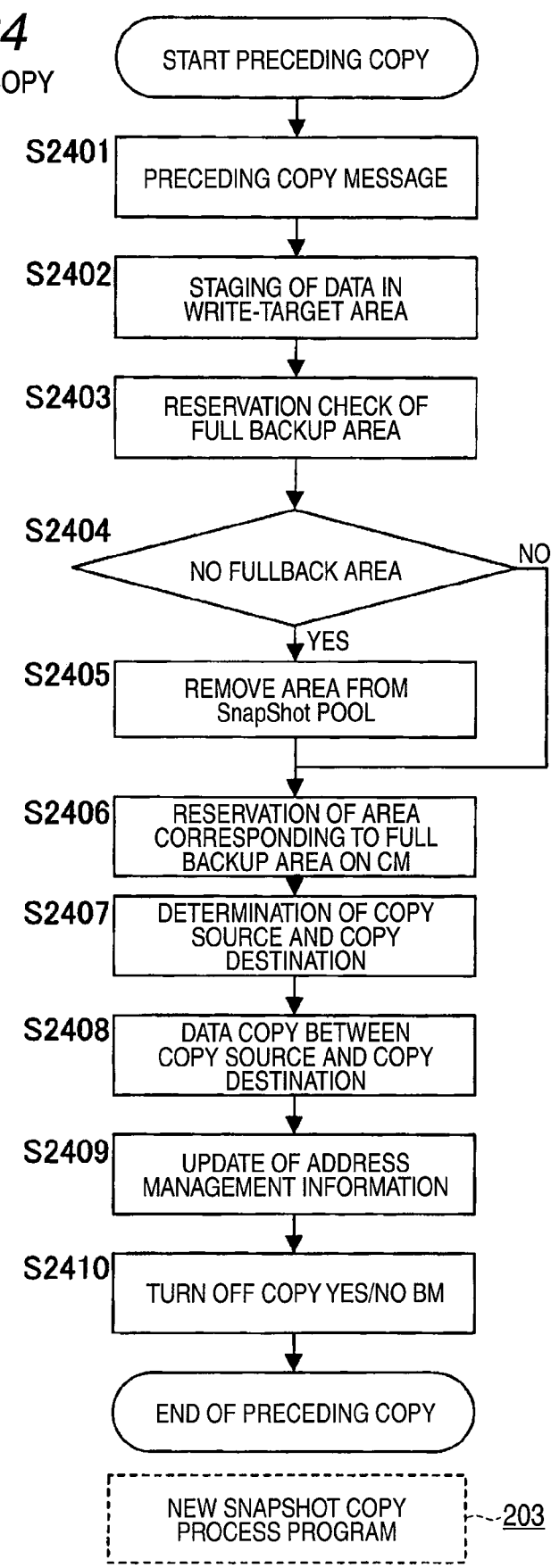
FIG. 24 is a diagram illustrating the preceding copy process to be executed at the time of data writing to an SVOL in the embodiment of the invention.

FIG. 24 is a diagram illustrating the preceding copy process to be executed at the time of data writing to the SVOL 702 in the embodiment of the invention.

The preceding copy process of FIG. 24 is executed in step S2313 of FIG. 23 when the copy YES/NO bit is determined in step S2312 of FIG. 23 as showing a value of "copy required" with a target of the management block of the SVOL 702 corresponding to the copy YES/NO bit. In the below, the management block being a target for this process is referred to as "write-target area".

When the preceding copy process is started, the new snapshot copy process program 203 forwards a preceding copy message (S2401).

The new snapshot copy process program 203 then reads the data stored in the write-target area of the SVOL 702 for storage into the cache memory 147, i.e., staging (S2402).

The new snapshot copy process program 203 then checks a full backup area in the snapshot capacity pool 703 (S2403).

Based on the check result in step S2403, the new snapshot copy process program 203 then determines whether the full backup area is reserved in the snapshot capacity pool 703 or not (S2404).

When the determination in step S2404 is NO, i.e., the full backup area is not reserved, the new snapshot copy process program 203 reserves the full backup area in the snapshot capacity pool 703 (S2505).

After completion of step S2405, or when the determination result in step S2404 is YES, i.e., the full backup area is reserved, the new snapshot copy process program 203 reserves, on the cache memory 147, an area corresponding to the full backup area (S2406).

The new snapshot copy process program 203 then determines a copy source and a copy destination (S2407), i.e., the data as a result of the staging in step S2402 is determined as being a copy source, and the area reserved in step S2406 is determined as being a copy destination.

The new snapshot copy process program 203 then performs data copying from the copy source to the copy destination determined as such (S2408). The data being a copying result on the cache memory 147 is then stored in the full backup area reserved in the snapshot capacity pool 703.

The new snapshot copy process program 203 then updates the address management information (S2409).

The new snapshot copy process program 203 then updates the copy YES/NO bit corresponding to the write-target area of the copy YES/NO BM 1402 to have a value indicating that the data copying is not required, i.e., the value of "0" in FIG. 14 example (S2410).

This is the end of the preceding copy process.

Figure 25:
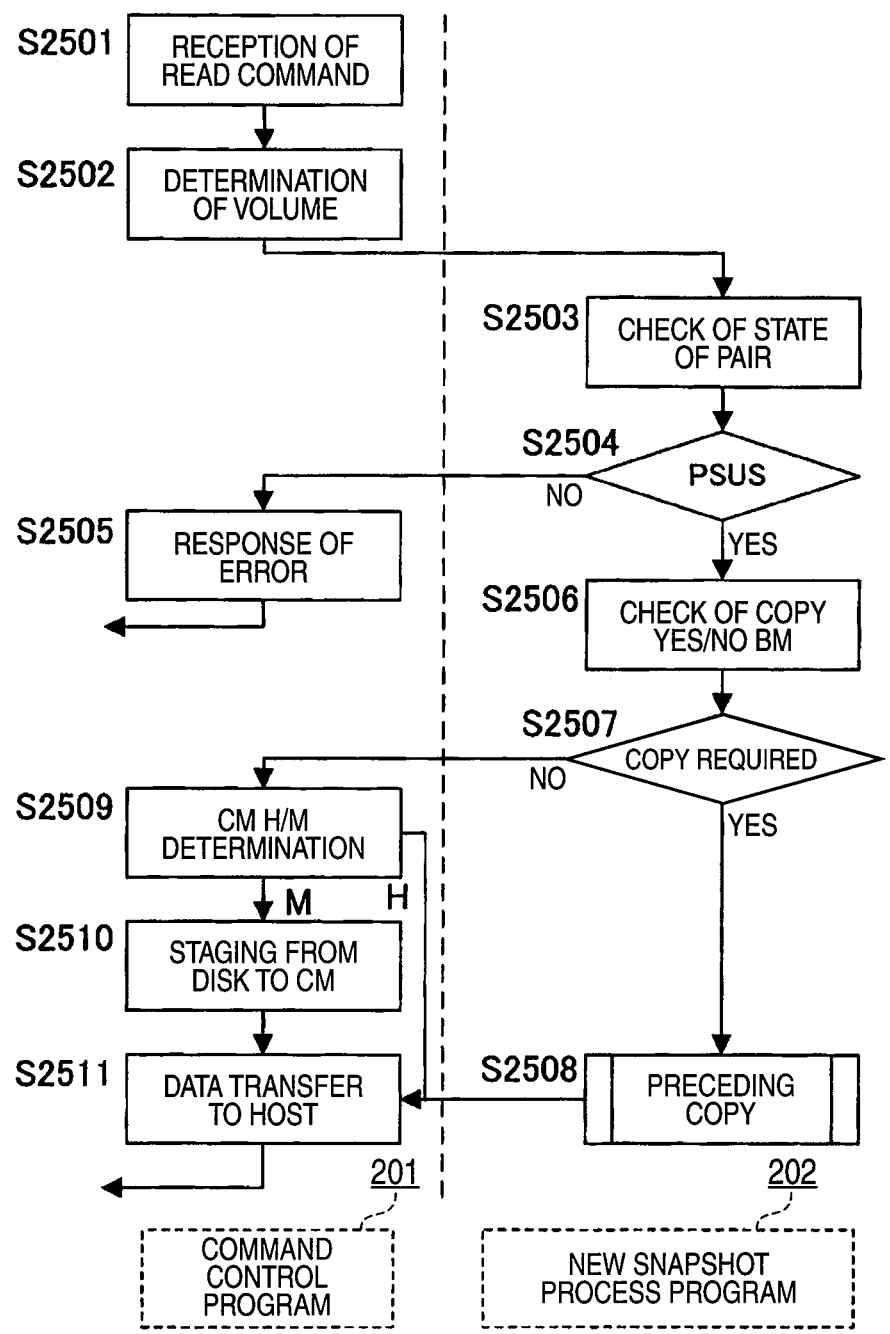
FIG. 25 is a diagram illustrating a data read process to be executed from an SVOL in the embodiment of the invention.

FIG. 25 is a diagram illustrating a data read process to be executed from the SVOL 702 in the embodiment of the invention.

When the command control program 201 of the first storage system 125 receives a read command with the SVOL 702 being a target from the backup server 102 or others, a read process of FIG. 25 is started (S2501).

The command control program 201 then determines which of the logical volumes is designated as a data read target by the read command (S2502). In FIG. 25 example, the SVOL 702 is designated as the data read target.

The new snapshot process program 202 then checks the state of a pair including the SVOL 702 designated as such (S2503).

The new snapshot process program 202 then checks whether the pair is in the state of "PSUS" or not (S2504).

When the pair is determined in step S2504 as not being in the state of "PSUS", the command control program 201 makes a response of error provided with a Check Status with respect to the read command (S2505).

When the pair is determined in step S2504 as being in the state of "PSUS", the new snapshot process program 202 checks the copy YES/NO BM 1402 of the pair (S2506).

Based on the check result of the copy YES/NO BM 1402, the new snapshot process program 202 determines whether there needs to copy the data stored in the area corresponding to the read-target address or not (S2507). This determination is made similarly to step S1912 of FIG. 19.

When the determination result in step S2507 is YES, i.e., data copying is required, the preceding copy process is executed (S2508). The preceding copy process to be executed in step S2508 is executed as described by referring to FIG. 24.

The command control program 201 then forwards the data read for the preceding copy process, i.e., the data being a copying result in the preceding copy process, to the backup server 102 or others (S2511).

On the other hand, when the determination result in step S2507 is NO, i.e., data copying is not required, the command control program 201 determines whether there is a cache hit or not (S2509).

When the determination result in step S2509 tells that there is a cache miss, the command control program 201 reads the data from the area of the SVOL 702 corresponding to the read-target address, i.e., actually the area of the snapshot capacity pool 703 corresponding to the area, for storage into the cache memory 147 (S2510).

The command control program 201 then forwards the data read in step S2510 to the backup server 102 or others (S2211).

This is the end of the data read process from the PVOL 701.

As described in the foregoing, in the embodiment, the differential data can create snapshots of a second generation and thereafter, thereby being able to implement snapshots with high capacity efficiency.

Moreover, according to the embodiment, for reading data stored in the SVOL 702, there is no need to access the PVOL 701. This accordingly enables the backup server 102 to read the data stored in the SVOL 702 even if the PVOL 701 suffers from failure. What is more, the backup server 102 can perform data reading/writing from/to the SVOL 702 without affecting any access made by the application server 101 to the PVOL 701.

What is claimed is:

1. A storage system for storing data written from a computer, the storage system comprising:
a memory medium that provides a physical memory area for the data; and
a control device that controls data input to the memory medium and data output from the memory medium,
wherein a part of the physical memory area is provided by the control device to the computer as a first logical volume,
wherein another part of the physical memory area is allocated to a pool region under the management of the control device, and
wherein the control device is configured to:
when receiving a write request to write to the first logical volume from the computer, store write data accompanied with the write request into the first logical volume,
when receiving a first-generation snapshot creation request, copy all of the data stored in the first logical volume into the pool region as data corresponding to a first-generation snapshot, and
when receiving a second-generation snapshot creation request after receiving the first-generation snapshot creation request, copy a part of the data stored in the first logical volume into the pool region as data corresponding to a second-generation snapshot, the part of the data being updated during between the first-generation snapshot creation and the second-generation snapshot creation.

2. The storage system according to claim 1, wherein management information is stored for establishing a correlation between the data stored in the pool region and a snapshot generation, and if receiving a request from the computer for reading data including a designation of the snapshot generation, the control device reads data corresponding to a snapshot of the designated generation from the pool region for transmission to the computer.

3. The storage system according to claim 2, wherein the control device is further configured to:
provide, to the computer, a second logical volume including a replica of the data stored in the first logical volume at the time of receiving the first-generation snapshot creation request, and a third logical volume including a replica of the data stored in the first logical volume at the time of receiving the second-generation snapshot creation request, the management information including information for establishing a correlation among the data stored in the pool region, the snapshot generation, and an address in the second logical volume and that in the third logical volume,
read, when receiving a request from the computer for reading the data in the second logical volume, from the data stored in the pool region, any portion of the data corresponding to the first-generation snapshot and to an address designated by the read request for transmission to the computer,
read, when receiving a request from the computer for reading the data in the third logical volume, from the data stored in the pool region, any portion of the data corresponding to the second-generation snapshot and to an address designated by the read request for transmission to the computer, and
read, when the pool region is not storing the data corresponding to the second-generation snapshot and to the address designated by the read request, from the data stored in the pool region, the portion of the data corresponding to the first-generation snapshot and to the address designated by the read request for transmission to the computer.

4. The storage system according to claim 1, wherein the control device is further configured to:
allocate, when the physical memory area is not allocated to a memory area in the pool region designated as a write destination of the data read from the first logical volume, the physical memory area to the memory area designated as the write destination.

5. The storage system according to claim 4, wherein when the data read from the first logical volume is of a predetermined pattern, the control device is further configured to:
allocate the physical memory area from the memory area in the pool region designated as the write destination for the data read from the first logical volume.

6. The storage system according to claim 5,
wherein the data of the predetermined pattern is stored in a predetermined area of the pool region, and
wherein when the physical memory area is not allocated to the memory area in the pool region corresponding to the address designated by the read request, the control device reads the data of the predetermined pattern from the predetermined area for transmission to the computer.

7. The storage system according to claim 1,
wherein an external storage system is coupled to the storage system,
wherein the external storage system is provided with an external memory medium for provision of a physical memory area for data, and
wherein the control device allocates the physical memory area provided by the external memory medium to at least either the first logical volume or the pool region.

8. A method for controlling a storage system storing data written from a computer, the storage system comprising a memory medium that provides a physical memory area for data; and a control device that controls data input to the memory medium and data output from the memory medium, wherein a part of the physical memory area is provided by the control device to the computer as a first logical volume, wherein another part of the physical memory area is allocated to a pool region under the management of the control device, and wherein the method comprises:
a first step of storing, when receiving a write request to write to the first logical volume from the computer, write data accompanied with the write request into the first logical volume;
a second step of reading, when a first-generation snapshot creation request is received, the data stored in the first logical volume at a time when the first-generation snapshot creation request is received, and writing the data being a read result into the pool region as data corresponding to a first-generation snapshot; and
a third step of copying, when receiving a second-generation snapshot creation request after receiving the first-generation snapshot creation request, a part of the data stored in the first logical volume into the pool region as data corresponding to a second-generation snapshot, the part of the data being updated during between the first-generation snapshot creation and the second-generation snapshot creation.

9. The method according to claim 8,
wherein the storage system stores therein management information for establishing a correlation between the data stored in the pool region and a snapshot generation, and wherein the method further comprises:

a fourth step of reading, when a request is provided by the computer for reading data including a designation of the snapshot generation, data corresponding to a snapshot of the designated generation from the pool region for transmission to the computer.

10. The method according to claim 9, wherein the control device provides, to the computer, a second logical volume including a replica of the data stored in the first logical volume at the time of receiving the first-generation snapshot creation request, and a third logical volume including a replica of the data stored in the first logical volume at the time of receiving the second-generation snapshot creation request, the management information includes information for establishing a correlation among the data stored in the pool region, the snapshot generation, and an address in the second logical volume and that in the third logical volume, wherein the method further comprises:

a fifth step of reading, when a request is provided by the computer for reading the data in the second logical volume, from the data stored in the pool region, any portion of the data corresponding to the first-generation snapshot and to an address designated by the read request for transmission to the computer; and a sixth step of reading, when a request is provided by the computer for reading the data in the third logical volume, from the data stored in the pool region, any portion of the data corresponding to the second-generation snapshot and to an address designated by the read request for transmission to the computer, and wherein in the sixth step, when the pool region is not storing the data corresponding to the second-generation snapshot and to the address designated by the read request, the portion of the data corresponding to the first-generation snapshot and to the address designated by the read request is read from the data stored in the pool region for transmission to the computer.

11. The method according to claim 8, further comprising:

a step of allocating, when the physical memory area is not allocated to a memory area in the pool region designated as a write destination of the data read from the first logical volume, the physical memory area to the memory area designated as the write destination.

12. The method according to claim 11, further comprising:

a step of deallocating, when the portion of the data read from the first logical volume is of a predetermined pattern, the physical memory area from the memory area in the pool region designated as the write destination for the data read from the first logical volume.

13. The method according to claim 12, wherein the data of the predetermined pattern is stored in a predetermined area of the pool region, and wherein the method further comprises:

a step of reading, when the physical memory area is not allocated to the memory area in the pool region corresponding to the address designated by the read request, the data of the predetermined pattern from the predetermined area for transmission to the computer.

14. The method according to claim 8, wherein the storage system is coupled with an external storage system, wherein the external storage system is provided with an external memory medium for provision of a physical memory area for data, and wherein the physical memory area provided by the external memory medium is allocated to at least either the first logical volume or the pool region.

* * * * *